Aug. 10, 1948.　　　　H. S. DAVIS　　　　2,446,871
SIGNALING SYSTEM FOR AUTOMOBILES
AND OTHER VEHICLES

Filed Dec. 23, 1947　　　　　　　　　　　　6 Sheets-Sheet 1

Inventor
Henry Spicer Davis
By Seymour, Earle & Nichols
Attorneys

Aug. 10, 1948.     H. S. DAVIS     2,446,871
SIGNALING SYSTEM FOR AUTOMOBILES
AND OTHER VEHICLES
Filed Dec. 23, 1947     6 Sheets-Sheet 4

Inventor
Henry Spicer Davis
By Seymour, Earle & Nichols
Attorneys

Fig. 7.

| VEHICLE SPEED M.P.H. | DURATION OF CYCLES (SECONDS) | OPERATING CONDITIONS {BRACKET: BRAKE — IN OPERATION / ACCELERATOR — IDLE} ||||||||||||
|---|---|---|---|---|---|---|---|---|---|---|---|---|---|
| | | FILAMENT 101a ON | FILAMENT 101a OFF | FILAMENT 101b ON | FILAMENT 101b OFF | FILAMENT 102a ON | FILAMENT 102a OFF | FILAMENT 102b ON | FILAMENT 102b OFF | FILAMENT 103a ON | FILAMENT 103a OFF | FILAMENT 103b ON | FILAMENT 103b OFF |
| STANDSTILL | 1.5 | ←CONTINUOUSLY ON→ | | ←CONTINUOUSLY OFF→ | | 0.75 | 0.75 | ←CONTINUOUSLY OFF→ | | 0.75 | 0.75 | ←CONTINUOUSLY OFF→ | |
| 5 | 1.72 | | | | | 0.86 | 0.86 | | | 0.86 | 0.86 | | |
| 10 | 2.00 | | | | | 1.00 | 1.00 | | | 1.00 | 1.00 | | |
| 12.5 | 2.18 | | | | | 1.09 | 1.09 | | | 1.09 | 1.09 | | |
| 15 | 2.40 | | | | | 1.20 | 1.20 | | | 1.20 | 1.20 | | |
| 16 | 2.50 | | | | | 1.25 | 1.25 | | | 1.25 | 1.25 | | |
| 17 | 2.60 | | | | | 1.30 | 1.30 | | | 1.30 | 1.30 | | |
| 18 | 2.72 | | | | | 1.36 | 1.36 | | | 1.36 | 1.36 | | |
| 19 | 2.86 | | | | | 1.43 | 1.43 | | | 1.43 | 1.43 | | |
| 19.5 | 2.92 | | | | | 1.46 | 1.46 | | | 1.46 | 1.46 | | |
| 20 —FIRST— | 3.03 | —CRITICAL— | —SPEED— | | | 1.51 | 1.51 | | | 1.51 | 1.51 | | |
| 20.1 | 3.03 | | | | | 2.00 | 2.00 | | | 2.00 | 2.00 | | |
| 25 | 4.00 | | | | | 3.00 | 3.00 | | | 3.00 | 3.00 | | |
| 30 | 6.00 | | | | | 6.00 | 6.00 | | | 6.00 | 6.00 | | |
| 35 | 12.00 | | | | | NO CONTINUOUSLY | | | | NO CONTINUOUSLY | | | |
| 40 —SECOND— | NONE | —CRITICAL— | —SPEED— | | | | | | | | | | |
| 40.1 & ABOVE | NONE → | | | | | | | | | | | | |

| | FILAMENT 104a ON | FILAMENT 104a OFF | FILAMENT 105a ON | FILAMENT 105a OFF |
|---|---|---|---|---|
| STANDSTILL | 0.75 | 0.75 | 0.75 | 0.75 |
| 5 | 0.86 | 0.86 | 0.86 | 0.86 |
| 10 | 1.00 | 1.00 | 1.00 | 1.00 |
| 12.5 | 1.09 | 1.09 | 1.09 | 1.09 |
| 15 | 1.20 | 1.20 | 1.20 | 1.20 |
| 16 | 1.25 | 1.25 | 1.25 | 1.25 |
| 17 | 1.30 | 1.30 | 1.30 | 1.30 |
| 18 | 1.36 | 1.36 | 1.36 | 1.36 |
| 19 | 1.43 | 1.43 | 1.43 | 1.43 |
| 19.5 | 1.46 | 1.46 | 1.46 | 1.46 |
| 20 | 1.51 | 1.51 | 1.51 | 1.51 |
| 20.1 | 2.00 | 2.00 | 2.00 | 2.00 |
| 25 | 3.00 | 3.00 | 3.00 | 3.00 |
| 30 | 6.00 | 6.00 | 6.00 | 6.00 |
| 35 | NO CONTINUOUSLY | | CONTINUOUSLY OFF | |

Fig. 8.

OPERATING CONDITIONS {BRAKE — FIRST OPERATED & THEN RELEASED AT ANY SPEED ABOVE THE FIRST CRITICAL SPEED & THEN AGAIN OPERATED & RELEASED AS SPEED FALLS BELOW FIRST CRITICAL SPEED / ACCELERATOR — IDLE}

| VEHICLE SPEED M.P.H. | DURATION OF CYCLES (SECONDS) | FILAMENT 101a ON | FILAMENT 101a OFF | FILAMENT 101b ON | FILAMENT 101b OFF | FILAMENT 102a ON | FILAMENT 102a OFF | FILAMENT 102b ON | FILAMENT 102b OFF | FILAMENT 103a ON | FILAMENT 103a OFF | FILAMENT 103b ON | FILAMENT 103b OFF | FILAMENT 104a ON | FILAMENT 104a OFF | FILAMENT 105a ON | FILAMENT 105a OFF |
|---|---|---|---|---|---|---|---|---|---|---|---|---|---|---|---|---|---|
| STANDSTILL | 1.5 | ←CONTINUOUSLY ON→ | | ←CONTINUOUSLY OFF→ | | 0.75 | 0.75 | ←CONTINUOUSLY OFF→ | | 0.75 | 0.75 | ←CONTINUOUSLY OFF→ | | 0.75 | 0.75 | 0.75 | 0.75 |
| 5 | 1.72 | | | | | 0.86 | 0.86 | | | 0.86 | 0.86 | | | 0.86 | 0.86 | 0.86 | 0.86 |
| 10 | 2.00 | | | | | 1.00 | 1.00 | | | 1.00 | 1.00 | | | 1.00 | 1.00 | 1.00 | 1.00 |
| 12.5 | 2.18 | | | | | 1.09 | 1.09 | | | 1.09 | 1.09 | | | 1.09 | 1.09 | 1.09 | 1.09 |
| 15 | 2.40 | | | | | 1.20 | 1.20 | | | 1.20 | 1.20 | | | 1.20 | 1.20 | 1.20 | 1.20 |
| 16 | 2.50 | | | | | 1.25 | 1.25 | | | 1.25 | 1.25 | | | 1.25 | 1.25 | 1.25 | 1.25 |
| 17 | 2.60 | | | | | 1.30 | 1.30 | | | 1.30 | 1.30 | | | 1.30 | 1.30 | 1.30 | 1.30 |
| 18 | 2.72 | | | | | 1.36 | 1.36 | | | 1.36 | 1.36 | | | 1.36 | 1.36 | 1.36 | 1.36 |
| 19 | 2.86 | | | | | 1.43 | 1.43 | | | 1.43 | 1.43 | | | 1.43 | 1.43 | 1.43 | 1.43 |
| 19.5 | 2.92 | | | | | 1.46 | 1.46 | | | 1.46 | 1.46 | | | 1.46 | 1.46 | 1.46 | 1.46 |
| 20 —FIRST— | NONE | —CRITICAL— | —SPEED— | | | NO CONTINUOUSLY | | | | NO CONTINUOUSLY | | | | CONTINUOUSLY OFF | | CONTINUOUSLY OFF | |
| 20.1 | NONE | | | | | | | | | | | | | | | | |
| 25 | NONE | | | | | | | | | | | | | | | | |
| 30 | NONE | | | | | | | | | | | | | | | | |
| 35 | NONE | | | | | | | | | | | | | | | | |
| 40 —SECOND— | NONE | —CRITICAL— | —SPEED— | | | | | | | | | | | | | | |
| 40.1 & ABOVE | NONE → | ←CONTINUOUSLY OFF→ | | | | | | | | | | | | | | | |

Inventor
Henry Spicer Davis
By Seymour, Earle & Nichols
Attorneys

Aug. 10, 1948.  H. S. DAVIS  2,446,871
SIGNALING SYSTEM FOR AUTOMOBILES
AND OTHER VEHICLES
Filed Dec. 23, 1947  6 Sheets-Sheet 6
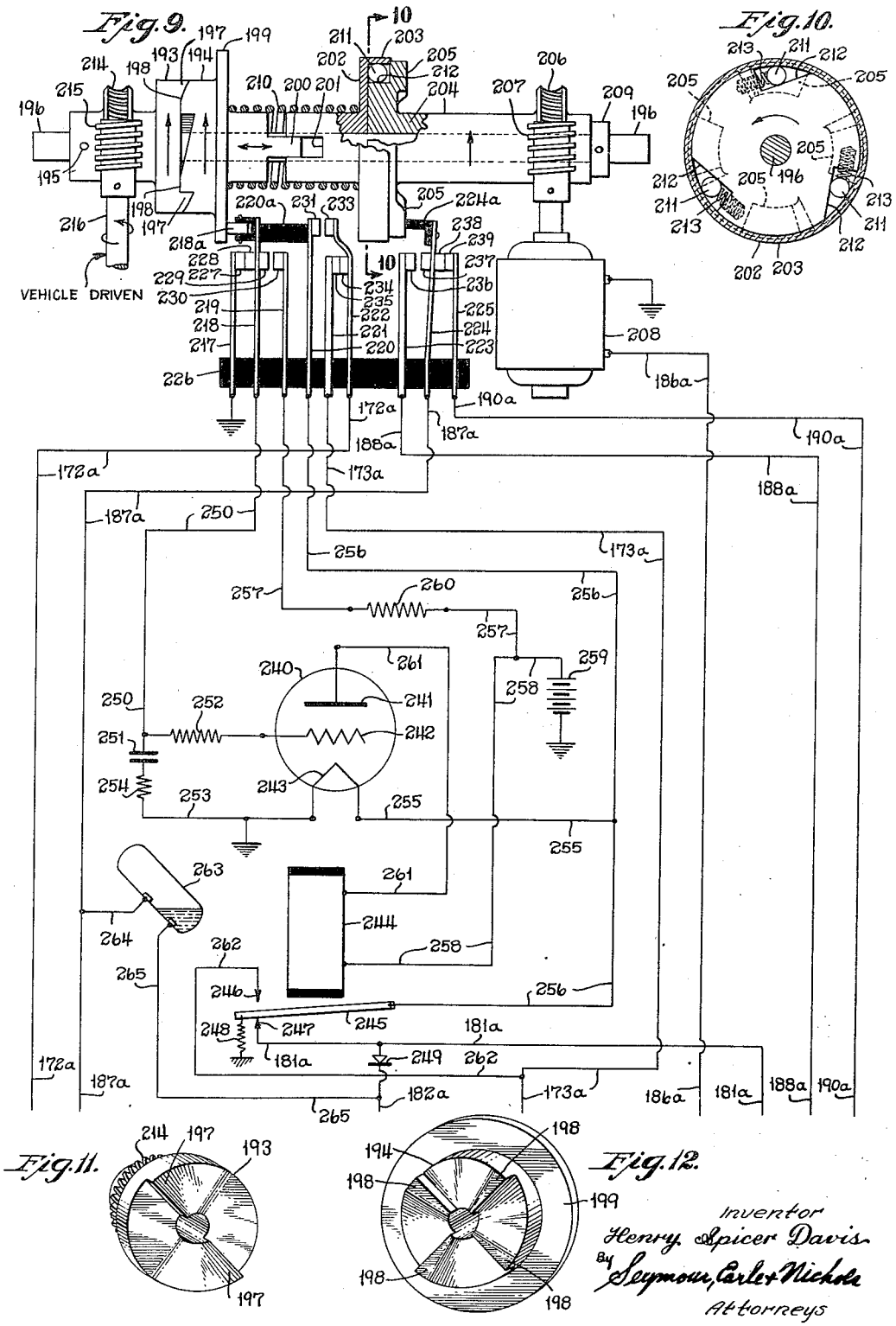

Patented Aug. 10, 1948

2,446,871

UNITED STATES PATENT OFFICE 2,446,871

SIGNALING SYSTEM FOR AUTOMOBILES
AND OTHER VEHICLES

Henry Spicer Davis, West Haven, Conn.

Application December 23, 1947, Serial No. 793,465

25 Claims. (Cl. 177—311.5)

The present invention relates to improvements in signaling systems and relates more particularly to improvements in automatic signaling systems for automobiles and other vehicles.

The signaling systems of the present invention constitute improvements upon the signaling systems disclosed in my co-pending application Serial No. 619,739, filed October 2, 1945.

Vehicle signaling systems have heretofore been proposed in which provision has been made for effecting electrical signals which vary with changes in the speed of the vehicle. Previous signaling systems have more specifically contemplated having the signals vary with respect to the length of the cycles (each cycle comprising an "off" and an "on" portion) and with variations of the "on" and "off" portions of each cycle varying with changes in speed of the vehicle.

The foregoing characteristics are not adequate under all circumstances or even desirable under certain circumstances unless judiciously combined with other signal characteristics which are attained with the signaling systems of the present invention.

One of the main objects of the present invention is to provide a superior signaling system for automobiles and other vehicles and by means of which signals of widely differing characteristics may be produced to thus better inform observers of the operating conditions of a vehicle ahead and the intentions of the operator thereof.

Another object of the present invention is to provide a superior signaling system of the character referred to, whereby electrical signals may be given having signaling cycles (each cycle having an "off" portion and an "on" portion) which are progressively shorter in duration as the speed of the vehicle decreases and in which one portion of each cycle remains substantially constant in duration despite changes in the speed of the vehicle, while the other portion of such a cycle varies in duration with the speed of the vehicle.

A further object of the present invention is to provide a superior signaling system for automobiles and other vehicles, whereby electrical signals may be given having signaling cycles which are progressively shorter in duration as the speed of the vehicle decreases and in which the "on" portion of each cycle remains substantially constant in duration despite changes in the speed of the vehicle, while the "off" portion of such a cycle varies in duration with the speed of the vehicle.

Still another object of the present invention is to provide a superior signaling system of the character referred to, whereby electrical signals may have signaling cycles which are progressively shorter in duration as the speed of the vehicle decreases and in which the "off" portion of each cycle remains substantially constant in duration despite changes in the speed of the vehicle, while the "on" portion of such a cycle varies in duration with the speed of the vehicle.

A still further object of the present invention is to provide a superior signaling system for automobiles and other vehicles by means of which electrical signals combining both of the characteristics referred to in the two immediately preceding objects, may be achieved.

Another object of the present invention is to provide a superior signaling system of the character referred to whereby electrical signals are given which differ in conspicuous and attention-attracting manners with variation in the conditions under which the vehicle is operated.

A further object is to provide a superior signaling system for automobiles and other vehicles which will accomplish results above referred to and which is simple and reliable in operation and low in cost for manufacture.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes;

Figure 3:
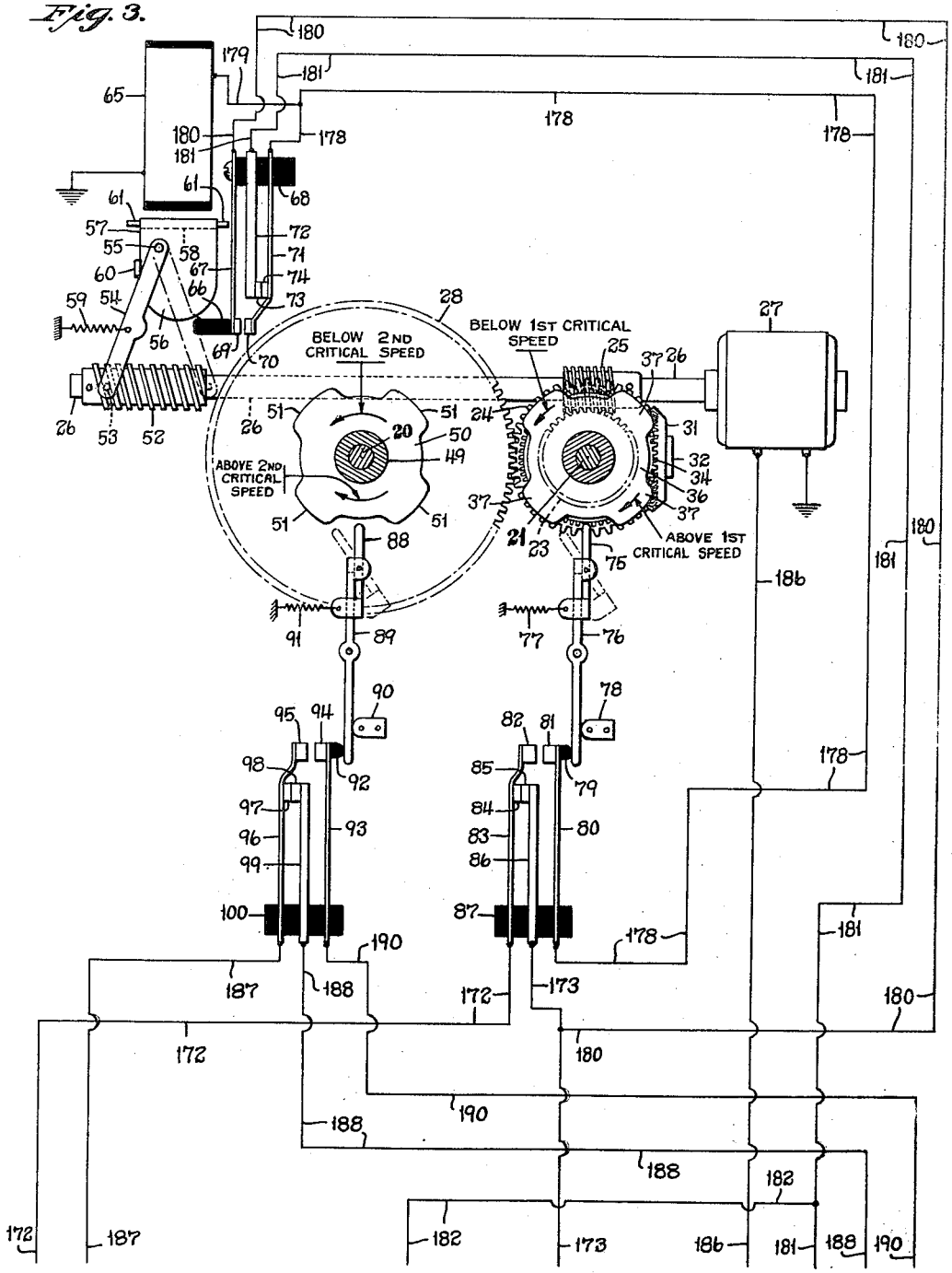
Fig. 3 is a sectional view taken on the line 3—3 of Fig. 1 and additionally showing schematically, portions of a complemental electrical system which latter is continued in Fig. 4.
Figure 4:
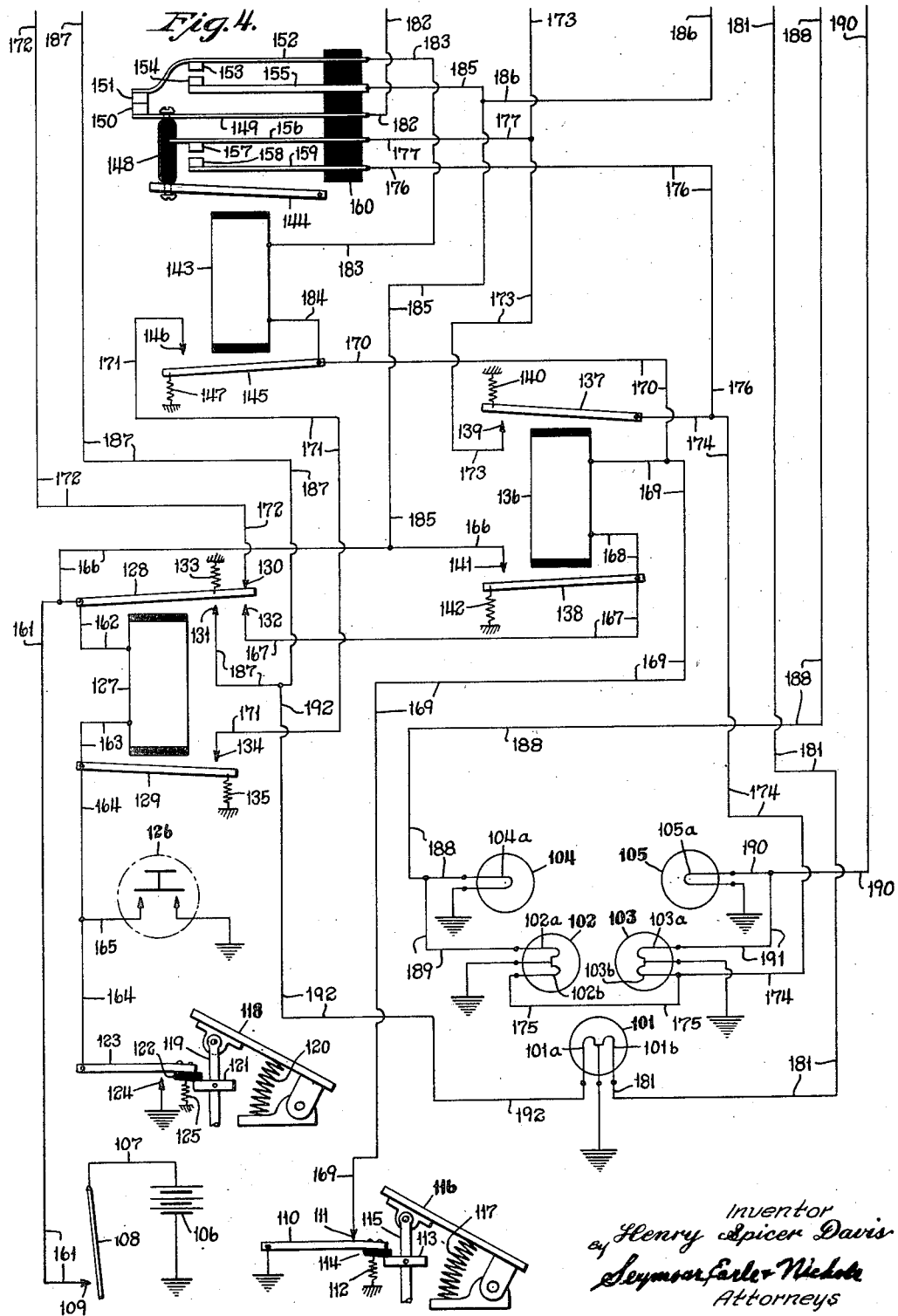
Fig. 4 is a schematic and diagrammatic illustration of the portion of the electrical system and apparatus which complements Fig. 3, to provide a complete signaling system in accordance with the present invention.

Figs. 5 to 8 inclusive are charts respectively representing the various signaling results achieved by various combinations of the operating features of an automobile or other vehicle;

Fig. 9 is a schematic and diagrammatic view similar to Fig. 3 and partly in section, but showing a modification suitable for use in conjunction with the showing of Fig. 4;

Fig. 10 is a transverse sectional view taken on the line 10—10 of Fig. 9; and

Figs. 11 and 12 are respectively perspective views of the two complemental cam-heads.

THE DISCLOSURE OF FIGS. 1 TO 4 INCLUSIVE

The particular automatic signaling-mechanism illustrated in Figs. 1 to 4 inclusive for purposes of making clear one form which the present invention may assume, includes a pair of parallel but laterally-spaced-apart control-shafts respectively designated by the reference characters 20 and 21.

Mounted with freedom for rotation upon the control-shaft 21 is a tubular hub 22 rigidly carrying a worm-wheel 23 and a gear-wheel 24.

Figure 1:
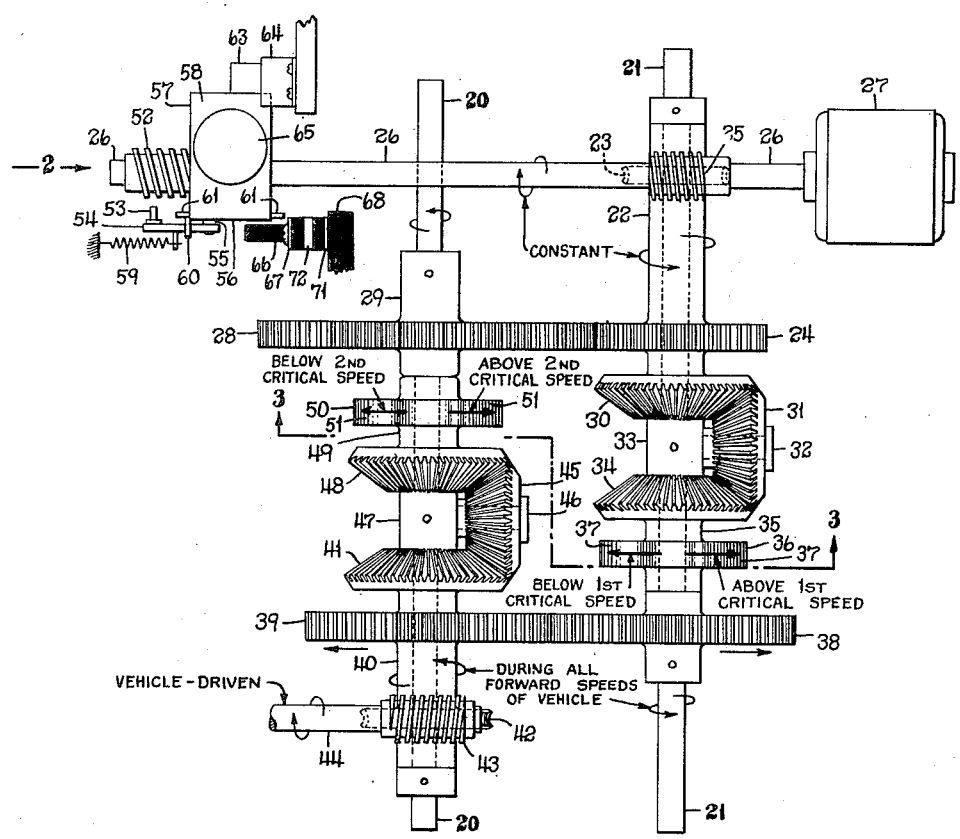
Fig. 1 is a schematic view of a control-mechanism suitable for use in a signaling system embodying the present invention.

Meshing into and driving the worm-wheel 23 is a worm 25 which is rigidly mounted upon a drive-shaft 26 extending at substantially a right angle with respect to the control-shafts 20 and 21, as is clearly shown in Fig. 1. The drive-shaft 26 above referred to may be an element of a fractional horsepower electric motor 27 which is preferably of the "shunt-wound" type or other suitable type which will provide substantially-constant speed.

Assuming, for illustrative purposes, that the electric motor 27 turns the drive-shaft 26 at 360 R. P. M., the said drive-shaft, through the intermediary of the worm 25 and worm-wheel 23, will turn the hub 22 and the gear-wheel 24 at substantially 10 R. P. M. and preferably in the direction indicated by the arrows in Figs. 1 and 2.

The gear-wheel 24 meshes into and drives a relatively larger (preferably two to one) gear-wheel 28 which is rigid with a hub 29 in turn rigidly attached to the control-shaft 20. Under the conditions just described, the control-shaft 20 will be driven at 5 R. P. M., but in a direction opposite to the direction of rotation of the gear-wheel 24.

The hub 22 before referred to upon which are rigidly mounted the worm-wheel 23 and the gear-wheel 24, also rigidly carries a bevel gear 30. The bevel gear 30 meshes into a bevel gear 31 mounted for rotation upon the stud 32 extending radially with respect to the control-shaft 21. The said stud 32 is rigid with and projects radially from a hub 33 which is rigidly secured to the control-shaft 21, as is indicated in Fig. 1.

The hub 33 above referred to is located intermediate the bevel gear 30 and a companion but-oppositely-facing bevel gear 34. The said bevel gear 34 also meshes into the bevel gear 31 and forms a rigid feature of a hub 35 mounted with freedom for rotation upon the control-shaft 21. The hub 35 just referred to also rigidly carries a disk-like control-cam 36 having four (more or less) cam-lugs 37 projecting radially from its periphery, as is especially well shown in Fig. 3.

Located adjacent the control-cam 36 and rigidly secured to the control-shaft 21, is a gear-wheel 38 which meshes into a similar gear-wheel 39 (preferably one-to-one ratio) forming a rigid feature of a hub 40 which is mounted with freedom for rotation upon the control-shaft 20.

In addition to the gear-wheel 39, the hub 40 above referred to also rigidly carries a bevel gear 41 and a worm-wheel 42. The worm-wheel 42 is meshed into and driven by a worm 43 rigidly mounted upon a drive-shaft 44, which latter may be connected in any suitable manner to a running portion of an automobile or other vehicle in such manner that the speed of the said drive-shaft changes with changes in speed of the vehicle. A convenient element of an automobile structure for utilization to rotate the drive-shaft 44 and the parts connected thereto, is the speedometer-drive forming a common feature of modern automobiles.

From the foregoing and by reference to Fig. 1 in particular, it will be seen that the vehicle will serve to turn the bevel gear 41 and the drive-shaft 21 at rates of speed varying with the speed of the vehicle of which the apparatus may form a feature. When the vehicle is traveling in a forward direction, the drive-shaft 44 will, in the instance shown, be turning in the direction indicated by the arrow upon it in Fig. 1, though when the vehicle is in reverse, the direction of rotation will be opposite.

Returning now to the bevel gear 41 which, as before noted, is driven by the running gear of the vehicle, it will be noted by reference to Fig. 1 in particular that the said bevel gear meshes into a bevel gear 45 mounted for rotation upon a stud 46 extending perpendicularly with respect to the control-shaft 20. The inner end of the stud 46 is rigid with a hub 47 which itself is rigidly mounted upon the control-shaft 20.

The hub 47 just above referred to is located intermediate the bevel gear 41 and a companion but-oppositely-facing bevel gear 48 which meshes into the bevel gear 45 and forms a rigid feature of a hub 49. In addition to the bevel gear 48, the hub 49 rigidly carries a disk-like control-cam 50 having four (more or less) cam-lugs 51 projecting radially from its periphery. The hub 49 as well as the bevel gear 48 and the control-cam 50 carried thereby are free to rotate relative to the control-shaft 20, for purposes as will hereinafter appear.

From the foregoing, it will be seen that the bevel gears 31 and 45 have capacity for rotation about their respective studs 32 and 46 and also have capacity for bodily turning movement respectively about the control-shafts 21 and 20 to provide differential-gear effects, in a manner as will hereinafter appear.

Before proceeding with a description of the mechanisms which are respectively actuated by the control-cams 36 and 50, attention may first be called to the mechanism which is actuated by the drive-shaft 26 which is propelled at a substantially-constant rate of speed by the electric motor 27.

At its end, remote from the electric motor 27, the drive-shaft 26 has rigidly mounted thereon a worm 52 which is adapted to be engaged by a pin or other suitable projection 53 rigidly mounted at the free end of a switch-actuating lever 54. The said lever 54 is pivotally connected by means of a stud 55 to the vertical arm 56 of a bell-crank armature generally designated by the reference character 57 and including also a substantially-horizontal arm 58.

The switch-actuating lever 54 has its lower end normally but yieldingly held to the left (as viewed in Fig. 3) by a helical return-spring 59 and in engagement with a stop-abutment 60 projecting forwardly from the vertical arm 56 of the bell-crank armature 57.

The bell-crank armature 57 is provided with oppositely-extending pintles 61—61 which are adapted to be mounted in suitable bearings (not shown) so that the said bell-crank armature may oscillate in directions required to engage and disengage the pin 53 of the switch-actuating lever 54 with the worm 52, all in a manner as will more fully hereinafter appear.

Figure 2:
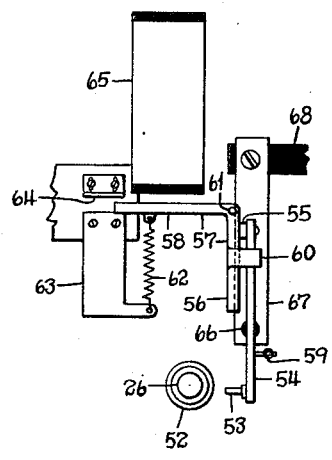
Fig. 2 is a broken detail elevational view looking in the direction of the arrow 2 of Fig. 1.

The bell-crank armature 57 is normally swung about its pintles 61—61 in a direction required to maintain its pin 53 out of engagement with the worm 52 by means of a helical return-spring 62 (Fig. 2). The return-spring 62 normally has its action limited by the engagement of the horizontal arm 58 of the bell-crank armature 57 with the upper end of a bracket 63 serving to provide a connection for the lower end of the return-spring 62, as is indicated in Fig. 2. The swinging movement of hte bell-crank armature 57 against the tension of the return-spring 62 is limited by an adjustable stop-abutment 64.

The bell-crank armature 57 is adapted to be swung in a clockwise direction (as viewed in Fig. 2) against the tension of its return-spring 62 by means of an electromagnet 65 located above the bell-crank armature 57 and having its lower end in close proximity to the horizontal arm 58 thereof.

When the lower end of the switch-actuating lever 54 is moved to the right (as viewed in Fig. 3) by the worm 52, under circumstances as will be hereinafter described, the said lever is adapted to engage with a block 66 of insulating material projecting from the lower end of a spring-like switch-arm 67 which depends from and is secured to a body of insulation 68.

On its side opposite its block of insulation 66, the switch-arm 67 is provided with a contact 69 which is adapted to engage with a complemental contact 70 carried by the lower end of a spring-like switch-arm 71 which also depends from the body of insulation 68, as is especially well shown in Fig. 3.

Intermediate the flexible or yielding switch-arms 67 and 71 there is located a relatively-rigid switch-arm 72 also depending from the body of insulation 68 but shorter than the said switch-arms 67 and 71. At its lower end and extending toward the switch-arm 71, the switch-arm 72 is provided with a contact 73 which is normally in engagement with a contact 74 carried by the flexible switch-arm 71 at a point above its previously-described contact 70.

Mounted in the path of movement of the cam-lugs 37 of the control-cam 36 is the free end of an actuating-lever 75 which is pivoted about midway of its length to the adjacent end of a switch-operating lever 76. The said switch-operating lever 76 is in turn mounted for pivotal movement intermediate its respective opposite ends, as is clearly illustrated in Fig. 3.

The turning movement of the actuating-lever 75 in a clockwise direction (as viewed in Fig. 3) is limited by the engagement of the inner face of its lower end with the adjacent face of the switch-operating lever 76. A helical spring 77 is attached to the lower end of the actuating-lever 75 to yieldingly hold the inner face of the lower portion of the said actuating-lever in engagement with the adjacent face of the upper portion of the switch-operating lever 76. The said spring 77 also serves to yieldingly hold the lower end of the switch-operating lever 76 in engagement with a stop-member 78.

For purposes as will hereinafter appear, the actuating-lever 75 is adapted to pivot in a counterclockwise direction with respect to the switch-operating lever 76, but to itself turn the said lever 76 in a clockwise direction when an effort is made by the cam-lugs 37 to turn the said actuating-lever 75 in a clockwise direction.

The lower arm of the switch-operating lever 76 is normally engaged with a block of insulation 79 projecting laterally from the upper end of a flexible switch-arm 80. The switch-arm 80 is provided with a laterally-projecting contact 81 which is normally out of engagement with but adapted to engage a contact 82 projecting from the free end of a flexible switch-arm 83 extending in substantial parallelism but laterally spaced from the companion flexible switch-arm 80, as is especially well shown in Fig. 3.

Below its upper contact 82, the flexible switch-arm 83 is provided with a second contact 84 which is normally engaged with a contact 85 laterally offsetting from a relatively-rigid switch-arm 86 located intermediate the two flexible switch-arms 80 and 83.

The switch-arms 80, 83 and 86 extend in substantial parallelism with each other and have their lower ends spaced and insulated from each other by a suitable body of insulation indicated by the reference character 87.

Mounted in the path of movement of the cam-lugs 51 of the control-cam 50 is the upper end of an actuating-lever 88 which is pivoted about midway of its length to the adjacent upper end of a switch-operating lever 89. The said switch-operating lever 89 is in turn mounted for pivotal movement intermediate its respective opposite ends, as is clearly illustrated in Fig. 3.

The turning movement of the actuating-lever 88 in a clockwise direction is limited by the engagement of the inner face of its lower arm with the adjacent portion of the switch-operating lever 89. In turn, the turning movement of the switch-operating lever 89 in a counterclockwise direction is limited by the engagement of its lower arm with a stop-member 90. A helical spring 91 is attached to the lower end of the actuating-lever 88 to yieldingly hold the lower arm thereof in engagement with the adjacent face of the upper arm of the switch-operating lever 89 and to also coincidentally hold the lower arm of the said switch-operating lever in engagement with the stop-member 90.

For purposes as will more fully hereinafter appear, the actuating-lever 88 is adapted to pivot in a counterclockwise direction with respect to the switch-operating lever 89, but to itself turn the said switch-operating lever in a clockwise direction when an effort is made by the cam-lugs 51 to turn the said actuating-lever 88 in a clockwise direction.

The lower end of the switch-operating lever 89 is normally engaged with a block of insulation 92 laterally offsetting from the upper or free end of a flexible switch-arm 93. On its side opposite the block of insulation 92, the switch-arm 93 is provided with a contact 94 which is normally spaced from but adapted to engage with a complemental contact 95 laterally offsetting from a flexible switch-arm 96.

Slightly below its contact 95, the flexible switch-arm 96 is provided with a contact 97 which is normally in engagement with a complemental contact 98 laterally offsetting from a relatively-rigid switch-arm 99 located laterally intermediate the two flexible switch-arms 93 and 96.

The switch-arms 93, 96 and 99 extend in substantial parallelism with each other and have their lower ends spaced and insulated from each other by a suitable body of insulation indicated by the reference character 100.

The mechanisms above described in conjunction with other mechanisms and with circuits to be presently described, serve to control the energization of five (more or less) signal lamps respectively designated by the reference characters 101, 102, 103, 104 and 105, or other suitable electric signals, in a manner as will more fully hereinafter appear.

Preferably, and as indicated in Fig. 4, the signal lamps 101 to 105 inclusive are arranged in V-shaped form and are preferably mounted on the exterior rear of an automobile or other vehicle substantially laterally centrally thereof and at a sufficient elevation to be readily observed by the operator of a following vehicle.

Each of the signal lamps 101 to 105 inclusive is preferably associated with a suitable translucent lens constructed of glass or plastic. The lens associated with the signal lamp 101 is preferably of the type having a blue center surrounded by a red outer portion. Preferably, each of the lens associated with the signal lamps 102 to 105 inclusive may be considered to be red.

The signal lamp 101 is provided with two separately-energizable filaments 101a and 101b and, similarly, the signal lamps 102 and 103 are each respectively provided with two separately-energizable filaments respectively designated by the reference characters 102a—102b and 103a—103b. In the instance shown, the signal lamps 104 and 105 are of the single filament type respectively having filaments 104a and 105a.

Each of the filaments 101a, 102a, 103a, 104a and 105a is preferably of the same candle power as the others of the group and preferably of higher candle power than the filaments 101b, 102b and 103b.

Associated with the features 20 to 100 inclusive previously described in effecting the energization of the signal lamps 101 to 105 inclusive, are further mechanisms which it is now proposed to describe before describing the circuits which interconnect the same.

As will be noted by reference to the lower left portion of Fig. 4, there is employed a source of electrical energy for the signaling system of the present invention which may be provided by any suitable means, and in the instance shown—and as is preferable—a storage battery 106 is shown which forms a part of the usual motor vehicle. The said battery has connected to one of its terminals by means of a wire 107 a switch-blade 108 which is adapted to be manually engaged with and disengaged from a complemental contact 109. The switch-elements 108 and 109 constitute what may aptly be termed a "master switch," since the said elements control the flow of current to the entire signaling system. The switch-blade 108 is preferably located in the automobile or other vehicle in position to be readily manually manipulated by the operator of the vehicle.

There is also employed an accelerator-operated switch-blade 110 which is adapted to engage with a contact 111 located adjacent thereto. A helical spring 112 exerts a constant-but-yielding effort to disengage the switch-blade 110 from the contact 111, but under some circumstances is overcome or counteracted by means of a collar 113 which engages with the underside of a block of insulation 114 secured to the free end of the switch-blade 110, as is shown in the lower portion of Fig. 4. The said collar 113 is rigidly mounted upon a throttle-plunger 115 which is pivoted at its upper end to the underside of an accelerator-pedal 116 of the automobile or other vehicle, and is urged to swing upwardly to engage the switch-blade 110 with the contact 111 by a helical spring 117 which is more powerful than the spring 112.

Located adjacent the accelerator-pedal 116 is a pivotal brake-pedal 118 having the upper end of a brake-operating plunger 119 pivotally connected to it adjacent its free end. The free end of the brake-pedal 118, and hence the plunger 119, is urged to swing upwardly by means of a helical spring 120, to thus engage a collar 121 on said plunger with a block of insulation 122. The block of insulation 122 just referred to is secured to the under face of the free end of a switch-blade 123 which is adapted to coact with an adjacent contact 124. Attached to the free end of the switch-blade 123 and urging the latter into engagement with the contact 124 is a helical spring 125 materially weaker than the spring 120 of the brake-pedal 118 and readily overcome thereby under conditions as will hereinafter appear.

For purposes of duplicating the switching action of the brake-pedal 118 but available for manual manipulation when it is not desired to operate the brake, is a push-button switch 126 preferably located within the vehicle in position for convenient manipulation by the operator of the vehicle. It may here be explained that the push-button switch 126 is desirable, in addition to the automatic switching action provided by the brake-pedal 118, inasmuch as traffic safety rules require that an operator make known his intent before he actually carries out his intent. Therefore, the manually-operable push-button switch 126 or its equivalent is preferably provided so that the operator may indicate his intent prior to his actual application of force upon the brake-pedal 118.

In conjunction with the features above described, there is employed an electromagnet 127 which has associated with its opposite ends respectively, pivotal armatures 128 and 129.

Associated with and adapted to be engaged by the armature 128 under given conditions, are three contacts 130, 131 and 132. For purposes as will hereinafter appear, the armature 128 is under some circumstances yieldingly held in engagement with the contact 130 and out of engagement with the contacts 131 and 132 by a helical spring 133, as is indicated in Fig. 4.

Associated with the armature 129 is a contact 134 which is adapted to be engaged by this said armature when the electromagnet 127 is energized. The armature 129 is adapted to be yieldingly held out of engagement with the contact 134 by means of a spring 135.

Also employed in conjunction with the features previously described, is an electromagnet 136 which, like the electromagnet 127, has operatively associated with its opposite ends respectively, pivotal armature 137 and 138.

Located adjacent the armature 137 just above referred to and adapted to be engaged thereby when the electromagnet 136 is energized, is a contact 139. The armature 137 is adapted to be yieldingly held out of engagement with its complemental contact 139 by means of a spring 140, as is indicated in Fig. 4.

Associated with the armature 138 so as to be engaged by the latter when the electromagnet 136 is energized, is a contact 141. The armature 138 is adapted to be yieldingly held out of engagement with its complemental contact 141 by means of a spring 142.

In addition to the electromagnets 127 and 136 above described, a third electromagnet 143 is employed. Operatively associated with the opposite ends respectively of the electromagnet 143 are pivotal armatures 144 and 145. When the electromagnet 143 is energized, the armature 145 is adapted to coact with a contact 146 though the said armature is normally held out of engagement with the said contact 146 by means of a spring 147.

The armature 144 is connected by means of an insulating-link 148 with a flexible switch-arm 149 adjacent the free end of the latter. At its free end, the said switch-arm 149 carries a contact 150 which is normally engaged with, though disengageable from, a complemental contact 151. The said contact 151 is carried at the free end of a flexible switch-arm 152 having a second contact 153 adjacent its free end, as is indicated in Fig. 4. The flexible switch-arm 152 is pretensioned so as to exert a constant effort to engage its contact 153 with a complemental contact 154 mounted adjacent a free end of a substantially-rigid switch-arm 155 extending in substantial parallelism with the said flexible switch-arm 152.

Located adjacent and extending in substantial parallelism with the flexible switch-arm 149 before described, is a switch-arm 156 having its free end coupled to the insulating-link 148 by being extended into a notch in the latter, all as indicated in the upper portion of Fig. 4. The switch-arm 156 carries a contact 157 which is normally out of contact with but which is adapted to be forced into engagement with a complemental contact 158 carried at the free end of a flexible switch-arm 159.

The switch-arms 149, 152, 155, 156 and 159 extend in substantial parallelism with each other and have their fixed ends spaced and insulated from each other by a suitable body of insulation indicated by the reference character 160.

By reference to the lower left-hand portion of Fig. 4 it will be seen that the contact 109 of the switch-blade 108 is connected by means of a wire 161 to the armature 128 which is associated with the electromagnet 127. The said armature 128 and hence also the wire 161 is connected by means of a wire 162 to one terminal of the electromagnet 127. The opposite terminal of the said electromagnet 127 is connected by means of a wire 163 to the armature 129 which also is operatively related to the electromagnet 127.

The armature 129, in turn, is connected by means of a wire 164 to the switch-blade 123 previously described and which is operatively associated with the brake-pedal 118. The wire 164 is also connected by means of a wire 165 to the push-button switch 126 previously described.

Connected to the wire 161 leading from the contact 109 of the master switch by means of a wire 166, is the contact 141 previously described and associated with the armature 138 of the electromagnet 136. The said armature 138, in turn, is connected by means of a wire 167 to the contact 132 associated with the armature 128 of the electromagnet 127. The armature 138 and hence also the wire 167 is connected by means of a wire 168 to one terminal of the electromagnet 136. The remaining terminal of the electromagnet 136 is connected by means of a wire 169 to the contact 111 associated with the accelerator-operated switch-blade 110.

The wire 169 connected to one terminal of the electromagnet 136, is connected by means of a wire 170 to the armature 145 associated with the electromagnet 143 and the contact 146. The contact 146 is connected, in turn, by means of a wire 171 to the contact 134 which is associated with the armature 129 of the electromagnet 127.

The contact 130 associated with the armature 128 of the electromagnet 127 is connected by means of a wire 172 (Figs. 4 and 3) to the flexible switch-arm 83 (Fig. 3). The relatively-rigid switch-arm 86 associated with the flexible switch-arm 83 just referred to is, in turn, connected by means of a wire 173 to the contact 139 associated with the armature 137 of the electromagnet 136. The said armature 137 is, in turn, connected by means of a wire 174 to the filament 103b of the signal lamp 103. The filament 103b just referred to is, in turn, connected by means of a wire 175 to the filament 102b of the signal lamp 102.

Connected to the wire 174 above referred to is a wire 176 which leads to the switch-arm 159 previously described and shown in the upper left portion of Fig. 4. The adjacent switch-arm 156 is connected by a wire 177 to the wire 173 previously described.

Returning now to the switch-arm 80 (Fig. 3), it will be noted that the said switch-arm is connected by means of a wire 178 to the flexible switch-arm 71 shown at the upper left portion of Fig. 3. Interconnecting the wire 178 just referred to and one terminal of the electromagnet 65, is a wire 179. The remaining terminal of the said electromagnet 65 is grounded as shown.

The flexible switch-arm 67 which is adjacent to the flexible switch-arm 71 just above referred to, is connected by means of a wire 180 to the wire 173 leading from the switch-arm 86.

The relatively-rigid switch-arm 72 (upper left portion of Fig. 3) is connected by means of a wire 181 to the filament 101b (Fig. 4) of the signal lamp 101.

The wire 181 just above referred to is connected by means of wire 182 to the flexible switch-arm 149, indicated at the upper left portion of Fig. 4. The flexible switch-arm 152 which complements the switch-arm 149 just referred to is, in turn, connected by means of a wire 183 to one terminal of the electromagnet 143. The remaining terminal of the said electromagnet is connected by means of a wire 184 to its complemental armature 145 and hence also to the wire 170.

The wire 166 which is connected to the contact 141 adjacent the electromagnet 136 (Fig. 4) is connected by means of a wire 185 to the relatively-rigid switch-arm 155 shown at the upper left portion of Fig. 4 and previously described. Connected, in turn, into the wire 185 is a wire 186 leading to one terminal of the electric motor 27, which latter has its remaining terminal grounded, as indicated in Fig. 3.

The contact 131 adjacent the electromagnet 127 (Fig. 4) is connected by means of a wire 187 to the flexible switch-arm 96 shown at the left central portion of Fig. 3. The relatively-rigid switch-arm 99 adjacent the flexible switch-arm 96 just referred to is, in turn, connected by means of a wire 188 to the filament 104a (Fig. 4) of the signal lamp 104. The remaining terminal of the filament 104a just referred to is grounded as shown. The wire 188 and hence the filament 104a is connected by means of a wire 189 to the filament 102a of the signal lamp 102. The common terminal of both the filament 102a and its companion filament 102b is grounded as shown in Fig. 4.

A flexible switch-arm 93 shown at the left central portion of Fig. 3 is connected by means of a wire 190 to the filament 105a of the signal lamp 105. The remaining terminal of the said filament 105a is grounded as shown. The wire 190 and hence also the filament 105a is connected by means of a wire 191 to the filament 103a of the signal lamp 103. The remaining terminal of the said filament 103a which is common also to the filament 103b is grounded, as shown in Fig. 4.

The filament 101a of the signal lamp 101 has one of its terminals grounded in common with one terminal of the companion filament 101b. The remaining terminal of the filament 101a is connected by means of a wire 192 to the wire 187 which leads from the contact 131 associated with the electromagnet 127.

THE OPERATION OF THE APPARATUS OF FIGS. 1 TO 4 INCLUSIVE

Figure 5:
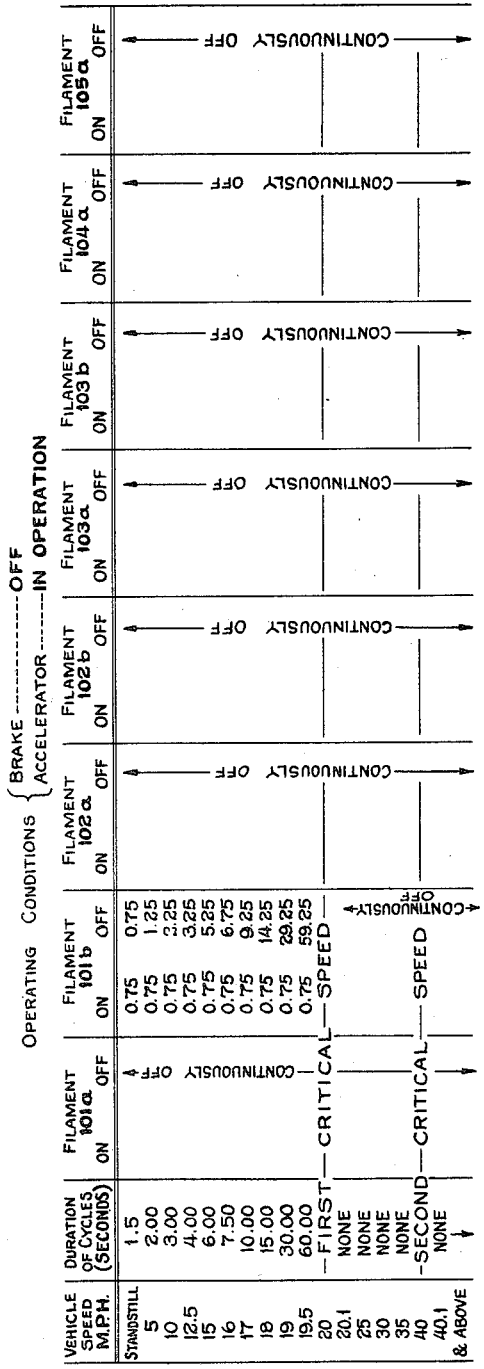

*Under conditions indicated in Fig. 5*

For purposes of making clear the operation of the automatic signaling system illustrated in Figs. 1 to 4 inclusive, it is convenient to first assume that the automobile or other vehicle with which the system is associated, is at a standstill and that the operator of the vehicle has manually engaged the switch-blade 108 of the master switch with its complemental contact 109. This closing of the master switch will supply energy from the storage battery 106 for the actuation and energization of the various instrumentalities previously described. It should further be assumed that operating pressure is at the time being exerted on the accelerator-pedal 116 (preparatory to the forward movement of the vehicle), thereby permitting the spring 112 to hold the switch-blade 110 out of engagement with its complemental contact 111. At this time it should also be assumed that no pressure is being exerted upon the brake-pedal 118.

Under the conditions above described, the electric motor 27 will be energized through the circuit which includes the features 107, 108, 109, 161, 166, 185 and 186.

The motor 27 will turn at a substantially-constant rate of speed and thereby effect the turning movement of the drive-shaft 26 in the direction indicated in Fig. 1. The turning of the drive-shaft 26 will similarly turn the worm 52 and the worm 25. The speed of rotation of the drive-shaft 26 may, of course, be any speed suitable for the operation of the signaling mechanism but in the instance shown, its speed may be assumed to be 360 R. P. M.

The rotation of the worm 25 will turn the worm-wheel 23 and hence also the hub 22 at substantially 10 R. P. M. in the direction of the arrow shown in Fig. 1. The turning of the hub 22 will similarly turn the unitary gear-wheel 24 and bevel gear 30.

Now inasmuch as the vehicle at this time is at a standstill, the control-shaft 21 will be held stationary by the gear-wheel 38 which is pinned to it and which meshes with the companion gear-wheel 39. The gear-wheel 39 will, at this time, be held stationary by its hub 40 and worm-wheel 42, inasmuch as the normally vehicle-driven worm 43 is at this time stationary.

Returning now to the bevel gear 30, it will be clear that the said bevel gear will turn the bevel gear 31 about the axis of the latter but without effecting any bodily movement of the said bevel gear 31, since at this time its stud 32 and hub 33 will be held stationary by the normally vehicle-driven control-shaft 21, which latter is at this time stationary since the vehicle is still stationary.

The bevel gear 31 rotating about the stud 32 as a center will, in turn, drive the bevel gear 34 in a direction (counterclockwise as viewed in Figs. 1 and 2) reverse from the direction in which the companion bevel gear 30 is being driven by the motor 27. The described turning of the bevel gear 34 will effect the similar turning of the control-cam 36 which is unitary with it and which together with the said bevel gear is free to turn with respect to the control-shaft 21.

The described turning movement (counterclockwise as viewed in Figs. 1 and 3) of the control-cam 36 will cause the cam-lugs 37 thereof to sequentially engage with the upper portion of the actuating-lever 75, thereby effecting the movement thereof in a clockwise direction and similarly moving the switch-operating lever 76 also in a clockwise direction against the tension of the spring 77 shown in Fig. 3.

The clockwise swinging movement of the switch-operating lever 76 as above described, will flex the switch-arm 80 from right to left (as viewed in Fig. 3) thereby causing its contact 81 to engage with the complemental contact 82 of the flexible switch-arm 83 to effect the flexure of the upper portion of the said switch-arm 83 in a direction from right to left. As the said switch-arm 83 is flexed as described, its lower contact 84 will be disengaged from its complemental contact 85 forming a feature of the rigid switch-arm 86.

Under the conditions now being described, the flexible switch-arm 83 will be receiving energy through the wire 172, inasmuch as the brake-pedal 118 is not depressed. Under these conditions, the supply of energy from the storage battery 106 will be through the elements 108, 109, 161, 128, 130 to the said wire 172.

Thus, as soon as the contact 81 engages with the contact 82, the former will receive energy from the latter and such energy will flow through the flexible switch-arm 80 to the wire 178 and thence to the flexible switch-arm 71 indicated in Figs. 1 and 3. The energy will now pass from the flexible switch-arm 71 to the rigid switch-arm 72 and thence will flow through the wire 181 to the filament 101b (Fig. 4) to energize the latter.

At the same time that the wire 178 is supplied with energy as above described, the electromagnet 65 will also be energized by way of the wire 179 leading to it from the said wire 178, as is indicated in Fig. 3. As soon as the electromagnet 65 is energized, it will turn the bell-crank armature 57 in a clockwise direction (as viewed in Fig. 2), thereby engaging the pin 53 of the switch-actuating lever 54 with the worm 52 at the outer end of the drive-shaft 26 of the motor 27.

As soon as the pin 53 engages with the worm 52 as above described, the switch-actuating lever 54 will be swung from left to right (as viewed in Figs. 3 and 1) until its pin 53 reaches the left-hand end of the grooves in the worm 52. Before completing its movement from left to right, the said lever 54 will engage with the block of insulation 66 carried at the lower end of the flexible switch-arm 67. The engagement referred to will cause the said switch-arm 67 to flex from left to right (Fig. 3) to thereby engage its contact 69 with the complemental contact 70 at the lower end of the flexible switch-arm 71 and will thereafter flex the said switch-arm from left to right.

The engagement of the contacts 69 and 70 as above described, does not at this particular time accomplish any electrical effect and serves only to mechanically cause the flexible switch-arm 71 to flex and disengage its contact 74 from the complemental contact 73 of the rigid switch-arm 72 to thereby break the circuit to the filament 101b (Fig. 4) to deenergize the latter. It so happens as the parts are proportioned in this particular instance, the opening of the contacts 74 and 73 will occur coincidentally with the opening of the contacts 81 and 82, since the vehicle is at this time operating under conditions of zero forward speed. Thus, the circuit to the filament 101b is broken substantially simultaneously by the opening of the contacts 73—74 and 81—82.

The opening of the contacts 81—82 will also break the circuit to the electromagnet 65. As soon as the electromagnet 65 is deprived of energy, the spring 62 (Fig. 2) will assert itself and restore the bell-crank armature 57 to the position in which it is shown in Fig. 2. This return movement of the bell-crank armature 57 will swing the switch-actuating lever 54 laterally away from the worm 52 and thus disengage the pin 53 from the said worm, whereupon the return-spring 59 will assert itself to again restore the said lever 54 to the position in which it is shown in Fig. 3.

Under the conditions above described and with the ratios chosen for purposes of illustration, the filament 101b (while the vehicle is at a standstill) will be energized for substantially three-quarters of a second and will remain deenergized for substantially three-quarters of a second, and the cycles of energization and deenergization will repeat as each cam-lug 37 of the control-cam 36 sequentially coacts with the actuating-lever 75.

During the flexing of the switch-arm 83 as above described, the contact 84 will move into and out of engagement with the contact 85, though under the particular circumstance here being described, this making and breaking of electrical engagement will in no way affect or alter the signal being given.

While the vehicle remains at a standstill, the switch-operating lever 76 and its associated features, as well as the switch-actuating lever 54 and its associated features, will repeat their cycles of operation as above described, since the lever 76 will move and return once for the passage of each cam-lug 37, and the lever 54 will move and return for each energization and deenergization of the electromagnet 65.

Reference may now be had to Fig. 5 wherein it will be noted, the filament 101b is (under the standstill conditions here being described) on and off for equal periods of time, namely, .75 second for each. The companion filaments 101a, 102a, 102b, 103a, 103b, 104a and 105a are under the circumstances not energized.

It may here be noted that the particular embodiment of the present invention above described and illustrated in Figs. 1 to 4 inclusive, has two "critical speeds" at which marked changes occur in the character of the signals. The "first" critical speed has been herein selected at about 20 M. P. H., while the "second" critical speed has been set at about 40 M. P. H.

Now let it be assumed that the vehicle starts forwardly and progressively gathers speed. As the speed of the vehicle increases, it will be noted by reference to Fig. 5 that the duration of the cycles increases up to the first critical speed of substantially 20 M. P. H. It will be further noted that the filament 101b, while remaining on for the same length of time during each cycle, remains off for a greater period of time, due to the progressively increasing duration of the cycles as the vehicle speed increases.

The progressively increasing duration (up to the first critical speed of 20 M. P. H.) will be occasioned by the fact that any forward movement of the vehicle will, through the intermediary of the parts 44, 43, 42, 40, 39 and 38, effect the rotation of the vehicle-driven control-shaft 21 in a clockwise direction. This clockwise rotation of the control-shaft 21 will similarly turn the hub 33 and will thereby cause the bevel gear 31 to be moved bodily in a clockwise direction while it is still being turned about its stud 32 as a center by the motor-driven bevel gear 30.

The described bodily movement of the bevel gear 31 in the same direction (clockwise) that the bevel gear 30 is turning, will in effect cause it to decrease in speed of rotation about its stud 32 and will thereby cause the said bevel gear 31 to drive the bevel gear 34 at a correspondingly slower rate.

The slower rate of rotation of the bevel gear 34 as above described will cause a correspondingly slower rotation of the control-cam 36, thereby causing the cycles of operation of the contacts 81 and 82 to consume longer periods of time. This action, if other mechanism was not provided, would merely serve to correspondingly extend both the on period and the off period of the filament 101b.

The foregoing will be better understood when it is appreciated that the speed of rotation of the bevel gear 34, and hence its unitary control-cam 36, will always be the difference between twice the speed of bodily movement of the bevel gear 31 and the speed of rotation of the bevel gear 30. For instance, at a forward vehicle speed of 5 M. P. H., the bevel gear 34 and its unitary control-cam 36 will have a rotational speed of 7.5 R. P. M. in a counterclockwise direction as viewed in Figs. 1 and 3.

The reason why the now-slower-rotating control-cam 36 does not increase the "on" time of the filament 101b is that the contacts 81 and 82 are in electrical series with the contacts 73 and 74 (upper left portion of Fig. 3). By this arrangement, after the control-cam 36 has engaged the contacts 81 and 82 to thus energize the filament 101b, the said contacts also energize the electromagnet 65 which will swing the switch-actuating lever 54 inwardly into engagement with the worm 52 and thereby break the circuit between the contacts 73 and 74, to thus deenergize the filament 101b. In the particular instance shown, the contact 74 will disengage from the contact 73 substantially .75 second after the electromagnet 65 has been energized.

Thus, it may be seen by reference to Fig. 5, that the filament 101b remains energized for substantially .75 second out of each cycle up to a vehicle speed of substantially 20 M. P. H. (or other desired first critical speed) but that the said filament remains unenergized for progressively increasing intervals of time as the speed of the vehicle increases up to the said first critical speed. At substantially 20 M. P. H. (the first critical speed), the rotation of the control-cam 36 will cease (as will also the operation of the contacts 81 and 82). However, as the speed of the vehicle moves above the said first critical speed, the control-cam 36 will start to turn in the opposite direction from that in which it has been previously turning and at progressively increasing speeds as the speed of the vehicle increases above the said first critical speed and up to the speed limit of the vehicle.

The reverse movement of the control-cam 36 as above described is occasioned by the fact that the speed of bodily movement of the bevel gear 31 now exceeds one-half of the rotational speed of the constantly-driven bevel gear 30.

The described reverse turning movement of the control-cam 36 will not actuate the switch-operating lever 76, since the actuating-lever 75 carried by the latter will merely idly tilt, as is indicated by broken lines in Fig. 3 and hence the filament 101b will not be energized.

It may here be explained that the control-cam 50 (companion to the control-cam 36) will be continuously turning in the direction (counter-clockwise) indicated in Figs. 1 and 3 during the described forward speed of the vehicle up to the second critical speed thereof, with the result that the said control-cam 50 will cause the periodic engagement of the contacts 94 and 95. This engagement of the said contacts will, however, under the conditions here being considered, not serve to cause the energization of any of the filaments controlled by it inasmuch as a brake-pedal 118 is not being depressed. Above the second critical speed, the control-cam 50 will reverse its direction of rotation and will then cease to operate the switch-operating lever 89.

Figure 6:
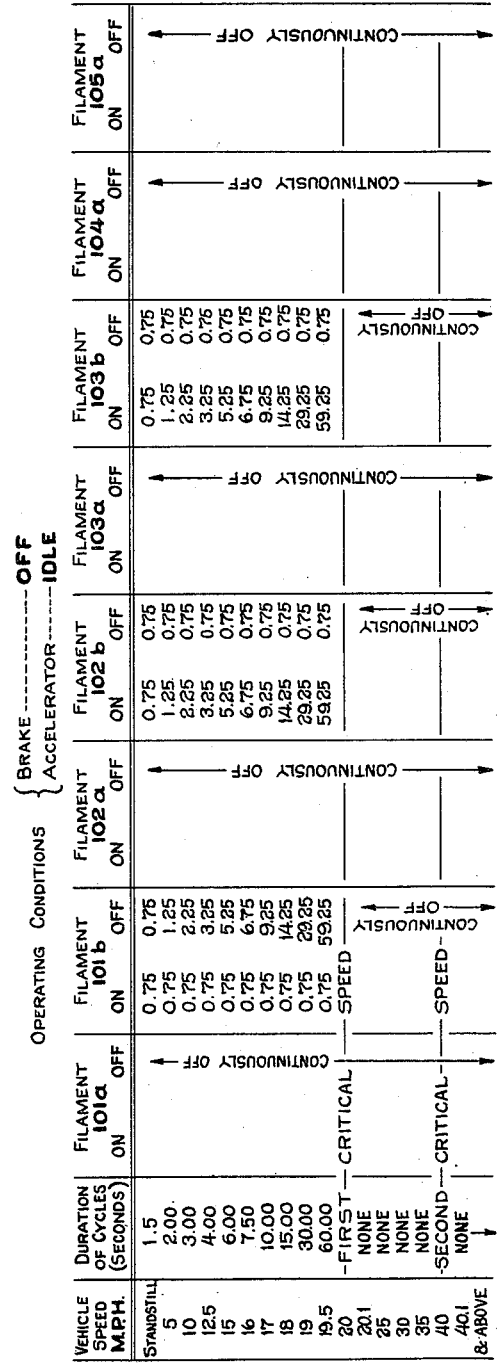

*Operation under conditions indicated in Fig. 6*

Having previously considered the operation of the system under the conditions wherein the operator is continuously depressing the accelerator-pedal 116 to continue the forward movement of the vehicle, the conditions indicated in Fig. 6 may now be considered, under which conditions the operator has released pressure from the accelerator-pedal 116 without having applied the brake. Such conditions might, for instance, occur when the operator of the vehicle is either coasting or is undecided as to his next course.

Now let it be assumed that when the operator removes pressure from the accelerator-pedal 116, the vehicle is traveling at a speed above the first critical speed of 20 M. P. H. Normally, on a level road the removal of pressure from the said accelerator-pedal will cause a slow-down of the vehicle, the speed of which will ultimately fall below the first critical speed of 20 M. P. H.

It may here be noted, and as will be seen by reference to Fig. 6, that at all speeds above the first critical speed, none of the filaments will be energized under the conditions now being described.

As shown, however, as the forward speed of the vehicle falls below the first critical speed (20 M. P. H., for instance), the control-cam 36 will again start to rotate in the direction (counter-clockwise) indicated in Figs. 1 and 3, and at progressively increasing speeds as the speed of the vehicle decreases.

The described turning movement of the control-cam 36 will again cause the actuation of the switch-operating lever 76 and thus will cause the opening and closing of the contacts 81 and 82, as well as of the contacts 84 and 85.

The opening and closing of the contacts 81 and 82 will again cause the energization of the electromagnet 65, to thus cause the movement of the switch-actuating lever 54, all in the manner previously described in connection with the description of the operating conditions indicated in Fig. 5. Thus, the filament 101b will be energized for like periods and will remain unenergized for progressively decreasing intervals of time, all as indicated in Fig. 6.

Now due to the fact that the accelerator-pedal 116 is not depressed, the accelerator-operated switch-blade 110 will be closing a circuit by its engagement with its complemental contact 111. When the first closing of the contacts 81 and 82 takes place as above referred to, a locking-circuit is energized, as will be presently described.

The first closing of the contacts 81 and 82 as above described, in addition to causing the first energization of the filament 101b, will also cause current to effectively flow through the wire 182, since the contacts 73 and 74 will be at this time in engagement. Thus, current will flow from the contact 74, thence through the contact 73, switch-arm 72, wires 181 and 182 to the flexible switch-arm 149. The current will then continue on through the contacts 150, 151 and flexible switch-arm 152 to the wire 183 to effect the energization of the electromagnet 143. The remainder of the circuit for the energization of the electromagnet 143 is provided by the elements 184, 170, 169, 111 and 110.

As soon as the electromagnet 143 is energized, it will immediately attract both of its armatures 144 and 145. The attraction of the armature 144 will downwardly flex the switch-arms 149 and 156, thereby disengaging the contact 150 from the contact 151 and engaging the contact 157 with the contact 158. Simultaneously with the action just referred to, the contact 153 will be engaged with the contact 154 (Fig. 4). The engagement of the contacts 153 and 154 will take place before the contact 150 separates from the contact 151, and will thus supply the current necessary to maintain the steady energization of electromagnet 143 despite the opening of the contacts 150 and 151.

Meanwhile, the switch-actuating lever 54 (Fig. 3) will have completed its movement from left to right with the result that it will have engaged the contacts 69 and 70 and disengaged the contacts 73 and 74 with the double result that the energy supplied concurrently to the filament 101b will be interrupted and (through the contacts 69 and 70) current will be supplied to filaments 102b and 103b, since at this time the contacts 157 and 158 are in engagement.

When in the continued rotation of the control-cam 36 the contacts 81 and 82 are opened, energy will still be supplied to the filaments 102b and 103b since the contacts 84 and 85 will close before the opening of the contacts 81 and 82.

As soon, however, as the contacts 81 and 82 are opened, the electromagnet 65 will be deprived of energy, thereby permitting the switch-actuating lever 54 to swing from right to left, thereby opening the contacts 69 and 70 and re-engaging the contacts 73 and 74. Meanwhile, however, energy is still flowing to the filaments 102b and 103b, due to the fact, in part, that the electromagnet 143 is still acting as a lock-in electromagnet. However, as soon in the continued rotation of the control-cam 36 as it causes the contacts 81 and 82 to re-engage, the contacts 84 and 85 will be disengaged, thereby breaking the circuit to the filaments 102b and 103b.

Meanwhile the lock-in electromagnet 143 will still be energized and will remain so until such time as the operator depresses the accelerator-pedal 116.

From the foregoing and by reference to Fig. 6, it will be seen that for each quarter-turn of the control-cam 36 in a counterclockwise direction (which is its direction of rotation below the first critical speed), the filament 101b will be energized for corresponding periods of time and de-energized for progressively decreasing periods of time as the speed of the vehicle decreases. Furthermore, the filaments 102b and 103b will be coincidentally energized whenever the filament 101b is deenergized and, conversely, will be deenergized during such periods as the filament 101b is energized.

Thus, the filament 101b on the one hand and the filaments 102b and 103b considered jointly on the other hand will give reverse indications. In other words, as the speed of the vehicle decreases below its first critical speed, the filaments 102b and 103b will be energized for progressively decreasing time intervals, while the filament 101b is deenergized. Thus, while the filament 101b is giving uniform periods of energization, the filaments 102b and 103b are giving corresponding periods of no energization or signal.

Each time the lock-in electromagnet 143 was energized in the manner above described, it also pulled and held its lower armature 145 in engagement with the contact 146. This action, however, caused no electrical effect under the circumstances above described, since the brake-pedal 118 was not depressed.

*Operation under conditions indicated in Fig. 7*

For the purposes of the greatest facility of description, let it be assumed now that the vehicle has a forward speed in excess of the second critical speed and that the brake-pedal 118 is depressed. Let it further be assumed that the accelerator-pedal 116 is idle (not depressed) though it may here be noted that the signals to be hereinafter described would not in any way be affected were the accelerator-pedal 116 accidentally depressed.

Now since the vehicle is moving at a speed in excess of the second critical speed, the signal given to a following vehicle will be the steady energization of the filaments 101a, 102a and 104a.

The steady energization of the filaments just referred to will be made possible due to the fact that the brake-pedal 118 is at this time depressed, thereby permitting the switch-blade 123 to be moved by its spring 125 into engagement with the contact 124. This engagement will complete a circuit through the electromagnet 127 (Fig. 4), thereby energizing the same.

The energization of the electromagnet 127 will cause it to attract both of its armatures 128 and 129. The movement of the armature 129 under the present circumstances causes no pertinent electrical action, but the described movement of the armature 128 causes it to engage with both of its complemental contacts 131 and 132 while moving out of engagement with the companion contact 130. Here again, the engagement of the armature 128 with the contact 132 will have no pertinent electrical effect, even though it will serve to energize the electromagnet 136 if the accelerator-pedal 116 is not being depressed. The engagement of the armature 128 with the contact 131 will supply current directly to the filament 101a and thus steadily energize the same. Now, since the wire 187 leading from the contact 131 leads also to the switch-arm 96 as well as leading to the wire 192 supplying current to the filament 101a, energy will be supplied under these conditions to the contact 97.

Now, since the control-cam 50 is rotating in a clockwise direction under the present conditions, its cam-lugs 51 will not actuate the switch-operating lever 89, so that the contact 97 will remain in engagement with the contact 98 thereby supplying energy to the switch-arm 99. Current will flow from the switch-arm 99 through the wire 188 to the filament 104a and the filament 102a, so that both of the latter will be steadily energized coincidentally with the steady energization of the filament 101a.

During the foregoing steady illumination of the filaments 101a, 102a and 104a, the control-cam 36 will also be rotating in a clockwise direction, but under the present circumstances will have no effect on the system inasmuch as the cam-lugs 37 will merely idly pass by the actuating-lever 75. The signal effects just described will be apparent by reference to the lower portion of Fig. 7.

Now let it be assumed that the vehicle slows down under the application of the applied brake to a speed below the second critical speed (40 M. P. H. in the present instance).

Now as the vehicle speed reaches the second critical speed, the previously clockwise-rotating control-cam 50 will come to a standstill and then, as the speed falls below this second critical speed, it will start slowly rotating in a counterclockwise direction, as is indicated in Figs. 1 and 3. The counterclockwise turning of the control-cam 50 will increase in speed as the speed of the vehicle decreases. The action just referred to will be caused by the effect of the bevel gears 41, 45 and 48.

As soon as the control-cam 50 turns in a counterclockwise direction, its cam-lugs 51 will cause the switch-operating lever 89 to swing back and forth alternately under the influence of said cam-lugs and the spring 91. The swinging action of the lever 89, under the force of the cam-lugs 51, will cause the said lever to flex the switch-arm 93 from right to left, to thus engage the contact 94 with the contact 95 of the flexible switch-arm 96 and as the motion continues will disengage the contact 97 from the contact 98.

The engagement of the contacts 94 and 95 as just above described, will serve to coincidentally energize the filaments 103a and 105a, since at this time the armature 128 is in engagement with the contact 131.

Immediately following the engagement of the contacts 94 and 95, the switch-arm 96 will be flexed so as to disengage the contacts 97 and 98, thereby deenergizing the wire 188 and, hence, also the previously-energized filaments 102a and 104a.

As a given cam-lug 51 of the control-cam 50 passes by the upper end of the actuating-lever 88 to thereby permit the spring 91 to assert itself, the contacts 97 and 98 will re-engage, followed almost immediately by the disengagement of the contacts 94 and 95.

Thus and as will be apparent by reference to Fig. 7, the coincidental energization of the filaments 102a and 104a will occur while the filaments 103a and 105a are deenergized, and conversely the filaments 103a and 105a will be energized while the filaments 102a and 104a are deenergized.

As the speed of the vehicle decreases, the cycles above referred to occur more frequently.

*Operation under conditions indicated in Fig. 8*

In describing the operation under conditions indicated in Fig. 7, it was assumed that the brake was held on until the vehicle had been brought to a stop and without any intervening release of the brake-pedal 118. The present conditions to be described are those which are likely to occur when the vehicle is coasting along with the accelerator idle and conditions arise wherein it is desired to momentarily apply the brake to retard the speed of the vehicle and then to release the brake. Under such conditions as just described, contrasting signals will be given at speeds above the first critical speed, as will appear from the following.

Let it be assumed that the vehicle is coasting along at any speed in excess of the first critical speed and that the operator of the vehicle depresses the brake-pedal 118.

Under the above conditions, the depression of the brake-pedal 118 will permit the spring 125 to move the switch-blade 123 (adjacent the said brake-pedal) into engagement with the contact 124, thereby grounding the circuit through the electromagnet 127 to thus energize the latter. The energization of the electromagnet 127 will cause the armature 128 to be engaged with the contacts 131 and 132 and disengaged from the contact 130 and will cause the armature 129 to be engaged with the contact 134.

Under the present circumstances (speeds above the first critical speed), the engagement of the armature 129 with the contact 134 will have no pertinent electrical effect. The engagement of the armature 128 with the contact 131 will energize the wire 187 and, hence, the flexible switch-arm 96 and thereby cause the steady concurrent energization of the filaments 101a, 102a and 104a in the manner described in connection with the showing of Fig. 7. The effect just referred to is not indicated in Fig. 8 for the reason that the brake-pedal has not as yet been released.

The above-referred-to engagement of the armature 128 with the contact 132 will serve to energize the electromagnet 136, thereby causing the latter to respectively engage its armatures 137 and 138 with the contacts 139 and 141.

The engagement of the armature 138 with the contact 141 renders the current supply to the electromagnet 136 independent of the contact 132 and thereby serves to provide a lock-in circuit which will maintain the electromagnet 136 energized until such time as the accelerator-pedal 116 is depressed.

The described engagement of the armature 137 of the electromagnet 136 with its complemental contact 139, serves to complete the circuit through the rigid switch-arm 86.

Under the conditions now being described, the control-cam 36 will be rotating in a clockwise direction, as is indicated in Figs. 1 and 3, with the result that its cam-lugs 37 will merely idly rock the actuating-lever 75 without effecting any movement of the contacts 81—82 and 84—85.

Let it now be assumed that despite the temporary application of the brake as above described, the speed of the vehicle is still above the first critical speed and that the downward pressure upon the brake-pedal 118 is removed.

The movement of the brake-pedal 118 into its idle position will break the engagement between the switch-blade 123 and its complemental contact 124, thereby deenergizing the electromagnet 127 to thus permit the armatures 128 and 129 thereof to reassume the positions in which they are indicated in Fig. 4.

Despite the disengagement of the armature 128 from the contact 132, the electromagnet 136 will still remain energized, due to the lock-in effect provided by the circuit through its armature 138 and complemental contact 141.

As the electromagnet 127 is deenergized as above described, the spring 133 will reassert itself and re-engage the armature 128 with the contact 130 (Fig. 4) thereby causing the steady energization of the filaments 102b and 103b through the elements 172, 83, 84, 85, 86, 173, 139, 137 and 174. The steady energization just referred to is made possible by the fact that the contacts 84 and 85 remain closed during this time, since the cam-lugs 37 of the control-cam 36 are idly engaging the actuating-lever 75.

Now let it be assumed that despite the fact that the operator has released downward pressure upon the brake-pedal 118, the vehicle continues to slow down until its speed falls below the first critical speed. Such a slow-down might be occasioned, for instance, by the vehicle encountering a hill and the operator failing to apply the accelerator. Under the conditions just referred to, the signals given would correspond to the signals indicated in Fig. 6 for speeds below the first critical speed.

In the fore part of this section there was described the action which would occur were the brake to be first operated and then released while the vehicle was moving at speeds above the first critical speed. It now becomes desirable to describe the results achieved should the brake be first applied and then released while the vehicle is moving at any speed below the first critical speed.

As before noted, when the vehicle is traveling at speeds below the first critical speed, the control-cam 36 will be rotating in a counterclockwise direction, with the speed thereof becoming faster as the speed of the vehicle decreases. When the said control-cam 36 is rotating in a counterclockwise direction, its cam-lugs 37 will act through the actuating-lever 75 to cause the rocking of the switch-operating lever 76.

As the switch-operating lever 76 is rocked, it will cause the closing and opening of the contacts 81 and 82 and the opening and closing of the contacts 84 and 85. Now due to the fact that at this time the accelerator-pedal 116 is idle, the first engagement of the contact 81 with its complemental contact 82 will complete the circuit through the electromagnet 143, thereby causing the latter to attract both of its armatures 144 and 145. The movement of the armature 145 toward the electromagnet 143 will close the circuit between itself and the contact 146 preparatory to causing the lock-in of the electromagnet 127 when the brake-pedal 118 is later applied, as will be hereinafter described.

The movement of the armature 144 toward the electromagnet 143 will cause the contacts 153—154 and 157—158 to engage, to be followed almost immediately by the separation of the contacts 150 and 151.

The engagement of the contacts 157 and 158 under the circumstances here being described will not have any pertinent electrical effect but the engagement of the contacts 153 and 154 will provide a lock-in circuit to maintain the energization of the electromagnet 143 until such time as the accelerator-pedal 116 is operated. The disengagement of the contacts 150 and 151, while serving to cut off the supply of current to the electromagnet 143 through one channel, is of no pertinence under the present circumstances, inasmuch as the said electromagnet 143 is now held energized by its previously-described lock-in circuit.

The signals which will now be given (speeds below the first critical speed) are indicated in the upper portion of Fig. 6.

Now let it be assumed that under the above described conditions and when the vehicle is moving at a speed below the first critical speed and with the accelerator-pedal 116 idle, the operator depresses the brake-pedal 118. Under these conditions, the switch-blade 123 adjacent the said brake-pedal, will engage with its complemental contact 124, thereby affording a ground for the circuit through the electromagnet 127 to thereby energize the latter. As soon as the electromagnet 127 is energized, it will attract both of its armatures 128 and 129.

The movement of the armature 128 into engagement with the contact 132 will at this particular time have no pertinent electrical effect, though the concurrent disengagement of the said armature 128 from the complemental contact 130 will serve to discontinue the signals which have been previously given and which are indicated in the portion of Fig. 6 above the line representing the first critical speed. The concurrent engagement of the armature 128 with the contact 131 will, through the intermediary of the wires 187 and 192, supply current to the filament 101a for the steady energization thereof and will close the circuit through the said wire 187 to the flexible switch-arm 96 shown in Fig. 3. Meanwhile, the control-cam 50 will under the present circumstances be turning in a counterclockwise direction, to thereby mechanically effect the flexing of both the flexible switch-arm 93 and the flexible switch-arm 96 in a manner previously described.

The periodic engagement (at progressively shorter intervals as the speed of the vehicle decreases) will complete the circuit through the switch-arm 93, wire 190 and wire 191 to the filaments 103a and 105a to effect the temporary energization thereof. Immediately following the engagement of the contacts 94 and 95, the switch-arm 96 will be flexed, to thereby break the circuit through the contacts 97—98, switch-arm 99, wire 188 and wire 189 to the filaments 102a and 104a which have previously been temporarily energized.

Thus, for each complete cycle of operation of the switch-operating lever 89, the filaments 103a—105a will be energized while the companion filaments 102a—104a are deenergized and vice versa. The cycles referred to will occur at increasingly greater speeds as the speed of the vehicle decreases, as is indicated in the portion of Fig. 8 lying above the line representing the first critical speed.

Let it now be assumed that the operator releases downward pressure from the brake-pedal 118, thereby causing the switch-blade 123 to disengage from the contact 124. This disengagement will not, however, deenergize the electromagnet 127, since at this time the latter is and will continue to be energized by the lock-in circuit provided by the armature 129 and its complemental contact 134. Thus, the signals still being given will be the same as those given just prior to the release of downward pressure upon the brake-pedal 118 and will so remain until such time as the accelerator-pedal 116 is again operated.

When under the present circumstances the accelerator-pedal 116 is depressed, the signal character will change over to that indicated in Fig. 5.

It is to be noted that the manual closing of the push-button switch 126 will serve the same purpose as the depression of the brake-pedal 118, and the subsequent opening of the said switch will have the same effect as the release of pressure from the said brake-pedal after the latter has been depressed.

THE DISCLOSURE OF FIGS. 9 TO 12 INCLUSIVE

The apparatus illustrated in Figs. 9 to 12 inclusive, is one which may be utilized in place of that shown in Fig. 3 and may be electrically interconnected with the portion of the apparatus shown in Fig. 4 in the same manner. For purposes of convenience of description, the main wires shown in Fig. 9 which are intended to connect onto the main wires in Fig. 4 will thus bear reference characters like those on the latter save that there is additionally applied the subscript a.

The mechanism illustrated in Figs. 9, 10, 11 and 12 includes two complementary cooperating rotary cam-heads 193 and 194 which are adapted for both concurrent and relative rotation and one at least of which is adapted for axial movement with respect to its complementary cam-head.

The rotary cam-head 193 is rigidly secured by means of a pin 195 to a shaft 196 which is adapted to be supported at its respective opposite ends in any suitable bearings (not shown) so as to have rotary movement.

The face of the cam-head 193 toward its complemental cam-head 194, is formed with two diametrically-opposite wedge-shaped cam-lugs 197. The face of the cam-head 194 adjacent the cam-head 193, is in turn provided with four wedge-shaped cam-lugs 198 which are adapted to coact with the cam-lugs 197 in a manner as will hereinafter appear.

The cam-head 194 is provided with an annular flange 199 and is mounted upon the shaft 196 with freedom for both rotary movement and axial movement with respect thereto. The said cam-head 194 is adapted on occasion for rotation independently of the cam-head 193 by being provided with a coupling-tongue 200 fitting into a coupling-notch 201 formed in the adjacent end of the hub of an outer clutch-member 202, forming a part of a one-way clutch, as will presently appear.

The outer clutch-member 202 is of cup-shaped form and includes an annular flange 203 extending parallel with the axis of the said clutch-member and toward and over an inner clutch-member 204.

The inner clutch-member 204 is formed on its face opposite the outer clutch-member 202 with four equidistantly-spaced cam-lugs 205 for purposes as will hereinafter appear. The inner clutch-member 204 is also rigidly provided with a worm-wheel 206 which is meshed into and driven by a worm 207 driven by an electric motor 208 which corresponds in functions and characteristics to the electric motor 207 previously described.

The inner clutch-member 204 is free for rotational movement relative to the shaft 196 and is held against axial movement in one direction by a collar 209 and is held against axial movement in the opposite direction by a helical spring 210 which serves to hold it seated against the collar 209. To accomplish this effect, among others, the spring 210 thrusts to the right on the outer clutch-member 202 and hence also on the inner clutch-member 204, and thrusts to the left (all as viewed in Fig. 9) on the cam-head 194 to thus yieldingly maintain the cam-lugs 198 thereof in coacting relationship with respect to the cam-lugs 197 of the cam-head 193.

As before noted, the clutch-members 202 and 204 form features of a one-way clutch-mechanism which mechanism is completed by a series of ball-like coupling-members 211. The inner clutch-member 204 is provided in its periphery with a plurality of notches 212, the floor of each of which provides a tangential surface serving to clamp one of the coupling-members 211 against the inner periphery of the flanges 203 of the outer clutch-member 202 under circumstances as will hereinafter appear. A plurality of springs 213 (one for each coupling-member 211) is carried by the inner clutch-member 204 and each such spring serves to yieldingly urge its complemental coupling-member 211 into the smaller end of the wedge-shaped space provided by a given one of the notches 212 and the adjacent inner surface of the flange 203, all as is especially well shown in Fig. 10.

The construction and arrangement of parts just above described (the one-way clutch-mechanism) serves to permit the electric motor 208 to drive the cam-head 194 in the rotary direction indicated by the arrows in Fig. 9, while at the same time permitting the said cam-head 194 to run ahead in a rotary direction of the constant speed at which the inner clutch-member 204 is being driven by the electric motor 208.

The cam-head 193 is driven in the direction indicated in Fig. 9 in consonance with the speed of the vehicle by being rigidly provided with a worm-wheel 214 which is meshed into and driven by a worm 215 which, in turn, is driven by a drive-shaft 216 driven, in turn, by a suitable portion of the running gear of a vehicle. The vehicle-driven drive-shaft 216 corresponds in functions and characteristics to the previously-described functions and characteristics of the vehicle-driven drive-shaft 44 of the form of the present invention illustrated in the preceding figures of the drawings.

Located adjacent the parts above described is a series of switch-arms comprising a rigid switch-arm 217, a flexible switch-arm 218, a flexible switch-arm 219, a flexible switch-arm 220, a rigid switch-arm 221, a flexible switch-arm 222, a rigid switch-arm 223, a flexible switch-arm 224 and a flexible switch-arm 225. At their ends remote from the shaft 196, all of the switch-arms just referred to are held in spaced relationship with respect to each other by a suitable body of insulation 226, as is indicated in Fig. 9.

At its free end, the flexible switch-arm 218 carries a roller 218a which engages with the adjacent face of the the flange 199 of the cam-head 194. The said free end of the switch-arm 218 is connected by an insulating-rod or link 220a to the free end of the flexible switch-arm 220. The free end of the flexible switch-arm 224 carries a finger 224a which engages with the cam-lugs 205 of the inner clutch-member 204.

At its free end, the rigid switch-arm 217 carries a contact 227 which is adapted to engage with a contact 228 carried adjacent the free end of the flexible switch-arm 218. Opposite its contact 228, the switch-arm 218 carries a contact 229 which is adapted to engage with a contact 230 located at the free end of the flexible switch-arm 219. At its free end, the flexible switch-arm 220 carries a contact 231 and is rigidly coupled to the flexible switch-arm 218 for concurrent flexing therewith by the coupling 220a formed of suitable insulating material. The contact 231 is adapted to engage with a contact 233 located at the free end of the flexible switch-arm 222. Inwardly of its contact 233, the switch-arm 222 is provided with a second contact 234 which is adapted to engage with a complemental contact 235 at the free end of the rigid switch-arm 221.

At its free end, the rigid switch-arm 223 is provided with a contact 236 which is adapted to coact with a complemental contact 237 carried by the flexible switch-arm 224 adjacent its free end.

The switch-arm 224 also carries a contact 238 which is adapted to engage with a contact 239 carried by the flexible switch-arm 225 adjacent its free end.

In conjunction with the switch-arms and contacts above described, there is employed an electronic-discharge tube generally designated by the reference character 240 of the triode type and including a plate 241, a control-grid 242 and a cathode 243 in the form of a directly-heated filament.

The electronic-discharge tube 240 above referred to is preferably of the vacuum type though an equivalent gas-filled triode tube may be employed.

Electrically associated with the tube 240 above described is an electromagnet 244 having an armature 245 pivotally mounted adjacent to it. Respectively mounted on opposite sides of the pivotal armature 245 are contacts 246 and 247. The said armature 245 is held by means of a spring 248 in engagement with the contact 247 and away from the contact 246 when the electromagnet 244 is not sufficiently energized to shift the pivotal armature 245.

The wire 172a (forming in effect an extension of the wire 172 of Fig. 4) is connected to the flexible switch-arm 222, as is indicated in Fig. 9. The wire 187a (a continuation of the wire 187 of Fig. 4) connects to the flexible switch-arm 224. The wire 182a (forming an extension of the wire 182 of Fig. 4) is connected through a suitable rectifier 249 to the wire 181a (forming a continuation of the wire 181 of Fig. 4). The said rectifier 249 provides for the flow of current from the wire 181a to the wire 182a and the features connected thereto without, however, permitting the flow of current in the reverse direction.

The wire 173a (forming a continuation of the wire 173 of Fig. 4) is connected to the rigid switch-arm 221. The wire 186a (forming a continuation of the wire 186 of Fig. 4) is connected to one terminal of the electric motor 208.

The wire 181a (forming a continuation of the wire 181 of Fig. 4) is connected to the contact 247 associated with the electromagnet 244 and also to the rectifier 249, as before pointed out. The wire 188a (forming a continuation of the wire 188 of Fig. 4) is connected to the rigid switch-arm 223, while the companion wire 190a (forming a continuation of the wire 190 of Fig. 4) leads to the flexible switch-arm 225 shown in Fig. 9.

The left-most (as viewed in Fig. 9) switch-arm 217 is provided with a ground connection, while the next adjacent flexible switch-arm 218 is connected by means of a wire 250 to one terminal of a condenser generally designated by the reference character 251. The wire 250 also connects with the control-grid 242 of the tube 240 through a resistor 252. The remaining terminal of the condenser 251 is connected by means of a wire 253 to one terminal of the filament 243, though having interposed therein a resistor 254. Intermediate the resistor 254 and the adjacent terminal of the filament 243, the wire 253 is connected to ground as shown, to thus provide a ground connection not only for the said resistor 254 but also for the filament 243.

The remaining terminal (right hand as viewed in Fig. 9) of the filament 243 is connected by means of a wire 255 to an intermediate portion of a wire 256. The said wire 256 interconnects the pivoted end of the armature 245 and the flexible switch-arm 220.

The flexible switch-arm 219 is connected by means of a wire 257 to another wire 258 in turn connected to a storage battery 259 or other suitable source of current supply. Interposed in the wire 257 just referred to is a resistor 260.

The wire 258 above referred to leading from the battery 259, extends to one terminal of the electromagnet 244, while the other terminal of the said electromagnet is connected by means of a wire 261 to the plate 241 of the tube 240.

The contact 246 associated with the armature 245 of the electromagnet 244 is connected by means of a wire 262 to the wire 173a before referred to.

Preferably and as shown, there is employed in conjunction with the other features described, a mercury switch 263 or other equivalent electrical switch. One terminal of the said mercury switch is connected by means of a wire 264 to the wire 187a. The remaining or companion terminal of the said switch is connected by means of a wire 265 to the wire 182a at a point such that the current flowing to it from the wire 182a will not also pass to the wire 181a, due to the intervention of a rectifier 249. The mercury switch 263 just referred to is designed and adapted in a manner as will hereinafter appear, to affect the signaling system under circumstances where the brakes of the vehicle are suddenly applied, to thus cause the mercury to close the circuit between the two contacts of the said switch 263.

THE OPERATION OF THE APPARATUS OF FIGS. 9 TO 12 INCLUSIVE IN CONJUNCTION WITH THE PORTION OF THE APPARATUS SHOWN IN FIG. 4

*Under conditions indicated in Fig. 5*

Here, again, it may be assumed that the automobile or other vehicle of which the apparatus now being described is associated, is at a standstill and that the operator of the vehicle has manually engaged the switch-blade 108 of the master switch with its complemental contact 109. This closing of the master switch will supply energy from the storage battery 106 (Fig. 4) for the actuation and energization of the various instrumentalities previously described in connection with the apparatus of Figs. 4 and 9 to 12 inclusive. It should further be assumed that operating pressure is at the time being exerted on the accelerator-pedal 116 (preparatory to the forward movement of the vehicle), thereby permitting the spring 112 to hold the switch-blade 110 (Fig. 4) out of engagement with its complemental contact 111. At this time it should also be assumed that no pressure is being exerted upon the brake-pedal 118.

Under the conditions above described, the electric motor 208 will be energized and caused to turn at a substantially-constant rate of speed. The said constant rate of speed in this instance may be considered to be such that it effects the rotation of the cam-head 194 at a speed corresponding to the speed at which the companion cam-head 193 would be rotated by the vehicle were the vehicle moving forwardly at this time at substantially 20 M. P. H. (the first critical speed).

Inasmuch, however, as the vehicle is, under the conditions now being described, at a "standstill," the cam-head 194 will rotate in the direction indicated in Fig. 9 with respect to the now-stationary companion cam-head 193. This relative rotation will cause the cam-lugs 198 of the cam-head 194 to move the said cam-head from left to right four times for each revolution of the cam-head 194 with respect to the companion cam-head 193.

As the cam-head 194 reciprocates as just above described, it will simultaneously flex both of the flexible switch-arms 218 and 220 from right to left, thereby causing the contact 228 to disengage from the contact 227 and almost immediately cause the contacts 229 and 231 to respectively engage with the contacts 230 and 233.

The disengagement of the contacts 227 and 228 will disconnect the upper plate of the condenser 251 from the ground, and as soon as the contacts 229 and 230 engage, a positive charge will be applied to the upper plate of the condenser 251 from the storage battery 259 through the resistor 260. The engagement of the contacts 231 and 233 will effect the separation of the contacts 234 and 235, though this latter action is, under the present circumstances, of no electrical significance. The engagement of the said contacts 231 and 233, however, will serve to energize the filament 243 of the tube 240 and also the filament 101b (Fig. 4) through the intermediary of the elements 256, 245, 247, 181a and 181.

When the positive potential has built up sufficiently in the control-grid 242, the current flow from the filament 243 to the plate 241 will be sufficient to energize the electromagnet 244 sufficiently to cause it to attract its complemental armature 245. Preferably and under the circumstances here being described, the charging of the condenser 251 and the energization of the associated features will be such that substantially 0.75 second will elapse between the time when the upper plate of the said condenser first starts to receive its positive charge, before the electromagnet 244 is sufficiently energized to attract its armature 245.

As soon as the armature 245 is attracted to the electromagnet 244 as above described, it will disengage from the contact 247 and engage with the contact 246. The engagement of the said armature with the contact 246 is, under the present circumstances, of no significant electrical effect, though the disengagement of the said armature from the contact 247 serves to deprive the filament 101b of energy. It may here be explained that due to the fact that the vehicle now is at a standstill, the rate of reciprocation of the cam-head 194 will be such that at substantially the same time that the armature 245 breaks the circuit to the filament 101b, the contacts 231 and 233 will be opened to also break the said circuit to the filament 101b as well as to the filament 243 of the tube 240. Coincidentally with the movement of the armature 245 and the opening of the contacts 231 and 233, the contacts 227 and 228 will be re-engaged to thereby ground the upper plate of the condenser 251 and the control-grid 242, preparatory to another cycle of operation when the cam-head 194 again moves from left to right as viewed in Fig. 9. Thus, the filament 101b will be energized for substantially 0.75 second and deenergized for a substantially corresponding length of time.

It may here be noted that while the cam-head 194 is reciprocating (while also turning) to effect the actions above described, the cam-lugs 205 of the inner clutch-member 204 will also be rotating, to thus cause the back-and-forth flexure of the flexible switch-arm 224. This action of the switch-arm 224 is, however, under the present circumstances of no electrical significance.

Before proceeding with a description of the apparatus of Figs. 9 to 12 inclusive under conditions where the vehicle is moving forwardly, it may first be explained that the apparatus of the said figures (in conjunction with the apparatus of Fig. 4) is designed and adapted to provide but one "critical speed," rather than to provide two critical speeds, as was the case with the apparatus of Figs. 1 to 4 inclusive. This single critical speed may, for purposes of description, be regarded as corresponding to the first critical speed indicated in Fig. 5.

The signals being given while the vehicle is at a standstill will be the same as those indicated in Fig. 5, as are also the signals which will be given as the vehicle starts forwardly.

Now let it be assumed that the vehicle starts forwardly and progressively gathers speed, under which condition the duration of the cycles will increase up to the speed of substantially 20 M. P. H. or as indicated in Fig. 5. Here again it may be noted that the filament 101b, while remaining on for the same length of time during each cycle, remains off for a greater period of time, due to the progressively increasing duration of the cycles as the vehicle-speed increases.

The described progressively increasing duration of the cycles will be occasioned by the fact that as the vehicle moves forwardly, the cam-head 193, instead of remaining stationary as heretofore, will also be rotated by the movement of the vehicle and in the same direction as the direction in which the cam-head 194 is being driven under the urge of the electric motor 208. As the vehicle-speed increases, the relative speeds between the cam-heads 193 and 194 will be progressively less.

From the foregoing it will be seen that the rate of reciprocation of the cam-head 194 will decrease as the speed of the vehicle increases, so that the tube 240 will act to energize the electromagnet 244, to thus cause the same to cut off the energy to the filament 101b after the same has been energized for the period of substantially 0.75 second, as previously described. From the facts just given it will be seen that as is indicated in Fig. 5, the filament 101b will be off for progressively increasing intervals of time as the speed of the vehicle increases, in substantially the same manner as has been effected by the apparatus illustrated in Figs. 1 to 4 inclusive.

When the forward speed of the vehicle reaches 20 M. P. H. or other desired critical speed, there will be no further signals given, inasmuch as there will be no relative rotation between the cam-heads 193 and 194 as both at this time will be driven at speeds corresponding to 20 M. P. H. respectively by the vehicle and by the electric motor 208.

As the speed of the vehicle increases above the critical speed just above referred to, the cam-head 193 will be rotating at speeds above the speed at which the companion cam-head 194 would at this time be driven by the motor 208. However, at this particular time the cam-lugs 197 of the cam-head 193 will drive the cam-head 194 at speeds corresponding to its own speed. This is made possible by the fact that the two clutch-members 202 and 204 will act as an over-riding clutch and permit the faster rotation of the cam-head 194 and its associated parts. Inasmuch as the cam-head 194 is driven by, and therefore is turning at the same rate of speed as, the cam-head 193, it will not reciprocate and, hence, no signals will be given.

It is now convenient to next consider the functioning of the parts under conditions indicated in Fig. 6, save that the second critical speed therein indicated may be ignored.

In changing from the indications represented in Fig. 5 to those indicated in Fig. 6, let it be assumed that the operator removes pressure from the accelerator-pedal 116 (Fig. 4) and that the vehicle-speed is above the critical speed of 20 M. P. H. At the speeds referred to, no signals will be given under the conditions here being considered until such time as the speed of the vehicle falls below the said critical speed.

Normally, on a level road the removal of pressure from the accelerator-pedal 116 will cause a slow-down in the speed of the vehicle, the speed of which will ultimately fall below the said critical speed of 20 M. P. H.

As the speed of the vehicle falls below the said critical speed, the cam-head 194 will be turning faster than the companion cam-head 193 and, therefore, the said cam-head 194 will reciprocate and will, therefore, flex the switch-arms 218, 220 and 222 and in cycles of progressively shorter time as the speed of the vehicle decreases.

The described reciprocation of the cam-head 194 will in addition to operating other contacts, cause the engagement of the contacts 231 and 233, with the result that energy will be supplied to the filament 101b through the channels previously described and will also cause the energization of the electromagnet 143 (Fig. 4) through the elements 220, 256, 245, 247, 181a, 249 (rectifier), 182a, 182, 149, 150, 151, 152, 183, 143, 184, 170, 169, 111 and 110.

As soon as the electromagnet 143 is energized as above described, it will immediately attract both of its armatures 144 and 145. The attraction of the armature 144 will downwardly flex the switch-arms 149 and 156, thereby disengaging the contact 150 from the contact 151 and engaging the contact 157 with the contact 158. Simultaneously with the action just referred to, the contact 153 will be engaged with the contact 154 (Fig. 4), which action will take place before the contact 150 separates from the contact 151. Thus, current necessary to maintain the steady energization of the electromagnet 143 will be supplied thereto, despite the opening of the contacts 150 and 151.

The previously described engagement of the contacts 231 and 233 will have energized the filament 243 of the tube 240, and substantially coincidentally the contacts 229 and 230 will have been engaged to thereby start the build-up of the necessary potential in the control-grid 242. As soon as the potential in the said control-grid is built up as before described, sufficient electrons will pass from the filament 243 to the plate 241 to thus energize the electromagnet 244 to the degree necessary to effect the attraction of the armature 245 after the lapse of substantially 0.75 second from the time that the contacts 229 and 230 engaged.

The movement of the armature 245 toward the electromagnet 244 deprives the filament 101b of energy and at the same time energizes the filaments 102b and 103b, due to the engagement of the said armature 245 with the contact 246.

Following the above described engagement of the contacts 231 and 233 due to the left-to-right axial movement of the cam-head 194, the said cam-head will move from right to left to thus open the contacts 231—233 immediately following the closing of the contacts 234 and 235. Thus, the opening of the contacts 231 and 233 will not cut off the supply of current to the filaments 102b and 103b, since such current is, under the circumstances, supplied by the closing of the contacts 234 and 235.

From the foregoing and by reference to Fig. 6, it will be seen that under the control of the cycles of reciprocation of the cam-head 194, the filament 101b will be energized for corresponding periods of time and deenergized for progressively decreasing periods of time, as the speed of the vehicle decreases. Furthermore, the filaments 102b and 103b will be coincidentally energized whenever the filament 101b is deenergized, and conversely will be deenergized during such periods as the filament 101b is energized.

Under the above described conditions, each time that the lock-in electromagnet 143 was energized, it also pulled and held its lower armature 145 into engagement with the contact 146. This action, however, caused no electrical effect under the circumstances here being considered, since the brake-pedal 118 was not depressed.

Conditions may now be considered under which the forward speed of the vehicle is in excess of the critical speed of 20 M. P. H. and under which the brake-pedal 118 is depressed. Under the present circumstances, it is of no moment as to whether or not the accelerator-pedal 116 is idle or operating, though it normally would be idle.

Under the conditions now being described, the filament 101a will be steadily energized through the elements 107, 108, 109, 161, 128, 131, 187 and 192, as may be seen by reference to Fig. 4.

Coincidentally with the described steady energization of the filament 101a, the filament 102a and 104a will be coincidentally energized, while the filaments 103a and 105a are deenergized. Conversely, when the filaments 103a and 105a are coincidentally energized, the companion filaments 102a and 104a will be deprived of energy.

The described action of the filaments 102a and 104a on the one hand, and 103a and 105a on the other hand, will be caused by the cam-lugs 205 on the inner clutch-member 204 which revolve at a predetermined constant rate of speed under the urge of the electric motor 208. Thus, each time that one of the cam-lugs 205 flexes the switch-arm 224 from left to right (Fig. 9), current will flow through the engaging contacts 238 and 239 to thus energize the filaments 103a and 105a. As soon as the given cam-lug 205 permits, the switch-arm 224 will flex from right to left, thereby disengaging the contacts 238 and 239 and engaging the contacts 237 and 236. This latter engagement will thus cause the coincidental energization of the filaments 102a and 104a.

The filaments 102a and 104a on the one hand, and 103a and 105a on the other hand, will perform in the same manner as above described for all forward speeds of the vehicle down to and including the standstill condition thereof.

It is now expedient to consider the action of the apparatus of Figs. 9 to 12 inclusive under conditions where the vehicle is moving forwardly at a speed in excess of 20 M. P. H. (or other desired critical speed) and where for one reason or another the brake-pedal 118 is depressed and then released—all while the accelerator-pedal 116 is idle.

Under the above conditions, the depression of the brake-pedal 118 will cause the filaments 101a, 102a—104a and 103a—105a to function in the same manner as was last above described.

However, when under the present conditions downward pressure is released from the brake-pedal 118 (the accelerator-pedal 116 at this time being idle), the filaments 102b and 103b will be coincidentally steadily energized, since the armature 137 will be held in engagement with the contact 139, since at this time the electromagnet 136 will be steadily energized by its lock-in circuit. Meanwhile, all of the remaining filaments will remain unenergized.

Now let it be assumed that despite the removal of pressure upon the brake-pedal 118, the vehicle slows down to a speed below 20 M. P. H. (or other previously determined critical speed) with the accelerator-pedal 116 still in its idle position. The resultant movement of the cam-head 194 from left to right (Fig. 9) will engage the contacts 231 and 233, thereby energizing the electromagnet 143. The electromagnet 143 will thus be caused to attract both of its complemental armatures 144 and 145.

The resultant movement of the armature 144 will cause the contacts 153 and 154 to engage and thus establish a lock-in circuit through the said electromagnet 143, which lock-in circuit will continue to function until such time as the accelerator-pedal 116 is depressed.

The energization of the electromagnet 143 as above described and the movement of both of its armatures 144 and 145, have not altered the character of the signals being given but are merely moved into position to be effective when the brake-pedal 118 is depressed.

When, now, the brake-pedal 118 is depressed, the described depression of the brake-pedal 118 will energize the electromagnet 127 as will be fully apparent by reference to Fig. 4, thereby causing the character signals to change to the steady energization of the filament 101a and the coincidental energization of the filaments 102a and 104a alternately with the energization of the filaments 103a and 105a. Thus, the signal will be restored to a character which has been previously herein described.

Now inasmuch as the armature 145 is being held (by the lock-in circuit of the electromagnet 143) in engagement with the contact 146, the lock-in circuit of the electromagnet 127 will be caused to function and thereby maintain the armature 128 out of engagement with the contact 130 and coincidentally in engagement with both of the contacts 131 and 132.

The same signals as just above described will continue, even though the pressure upon the brake-pedal 118 is released and as long as the accelerator-pedal 116 remains idle.

It may now be assumed that the accelerator-pedal 116 is depressed, whereupon the previously established lock-in circuits of the electromagnets 143 and 127 will be discontinued and the character of the signals being given will automatically change over to a pattern indicated in Fig. 5 for speeds below the first critical speed.

*The functioning of the mercury switch 263 of Fig. 9*

The mercury switch 263 is so placed upon the vehicle that any sudden application of the brake-pedal 118 to check the forward movement thereof will cause the pool of mercury to connect the two complemental contacts thereof and, hence, connect the wires 264 and 265. This action will energize the electromagnet 143, causing the lock-in circuit thereof to function without requiring—as has previously been the case—that any other features of the apparatus should previously act.

The energization of the lock-in circuit of the electromagnet 143 as just described, will in turn cause the lock-in circuit of the electromagnet 127 to function, thereby causing the previously described pattern of signals to be given, namely, the steady energization of the filament 101a and the alternate energization of the filaments 102a and 104a on the one hand, and 103a and 105a on the other hand. This signaling condition will be maintained even after the brake-pedal 118 is released, until such time as the accelerator-pedal 116 is again depressed.

It may here again be noted that the manual closing of the push-button switch 126 will serve the same purpose as the depression of the brake-pedal 118. The subsequent opening of the said switch will have the same effect as the release of pressure from the said brake-pedal after the latter has been depressed.

Résumé

From the foregoing and from general experience, it will be apparent that an effective signaling system for vehicles must, in the interests of traffic safety, be able to give a multiplicity of adequate signals by means of mechanisms and electrical circuits so constructed and arranged as not to give unnecessary signal indications. It is of the utmost importance that unnecessary signal indications not be given, since such signal indications are apt to create a disregard by observers of such part of the signal indications as are of the utmost importance for traffic safety.

As will be apparent from the foregoing, the mechanisms and electrical circuits of the present invention are so constructed and arranged that an adequate variety of signal indications are given which vary in a multiplicity of characteristics responsive to changes in speed of the vehicle and the conditions of operation of the accelerator, brake, etc., without, however, causing unnecessary signal indications to be given such as would detract from the effectiveness of the system as a whole.

By means of the present invention, the many variable factors connected with the operation of a vehicle and which are helpful if known by an observer, are readily observable and are of such character as to be arresting in their variations without, however, causing confusion in the mind of the observer. These advantages of the present invention are achieved by means which is reliable in its operation and not subject to derangement under even considerable conditions of abuse.

It will be observed that as the speed of the vehicle decreases under some conditions before described, the character of the signals automatically varies in accordance with such decrease such, for instance, as by giving repeating cycles of on-period phases alternating with off-period phases, and with either the on-period phases or the off-period phases having substantially corresponding duration, while the remaining phase of each of the repeating cycles progressively decreases in duration as the speed of the vehicle decreases.

As shown and described, it is preferred to employ electrically-responsive signal-means in the form of one or more signal lamps, but it will be fully apparent to those skilled in the art that other forms of such signal-means may be employed such, for instance, as electromagnetic wigwag-means common in the signal art.

Furthermore, as will also be apparent to those skilled in the art, the signal-means above referred to need not be in the same vehicle as the control-means, but may be located in a plurality of other vehicles to be energized by current-transmitting means of radio-wave characteristics.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A signaling system for vehicles, including in combination: electrically-responsive signal-means; a source of electrical energy; current-transmitting means supplying energy from the said source to the said signal-means; switch-means associated with the said current-transmitting means and controlling the energization and deenergization of the said signal-means; substantially-constant-speed drive-means functioning independently of the speed of the vehicle; and automatic control-means for the said switch-means, the said control-means including a first member driven by the running-gear of the vehicle and varying in speed with variations in the speed thereof, a second member driven by the aforesaid constant-speed drive-means, and translating-means jointly operated by both of the said first member and second member and in turn translating the relative movements thereof into operation of the said switch-means, the said translating-means being constructed and arranged to cause the said switch-means to energize and deenergize the said signal-means to provide repeating cycles of on-period phases alternating with off-period phases and with each of one type of repeating phases being of substantially-corresponding duration despite variations in speed of the vehicle and the other said type of phases progressively decreasing in duration as the speed of the vehicle decreases.

2. A signaling system for vehicles, including in combination: electrically-responsive signal-means; a source of electrical energy; current-transmitting means supplying energy from the said source to the said signal-means; switch-means associated with the said current-transmitting means and controlling the energization and deenergization of the said signal-means; substantially-constant-speed drive-means functioning independently of the speed of the vehicle; and automatic control-means for the said switch-means, the said control-means including a first member driven by the running-gear of the vehicle and varying in speed with variations in the speed thereof, a second member driven by the aforesaid constant-speed drive-means, and translating-means jointly operated by both of the said first member and second member and in turn translating the relative movements thereof into operation of the said switch-means, the said translating-means being constructed and arranged to cause the said switch-means to energize and deenergize the said signal-means to provide repeating cycles of on-period phases alternating with off-period phases and with each of the repeating on-period phases being of substantially-corresponding duration despite variations in speed of the vehicle and the said off-period phases progressively decreasing in duration as the speed of the vehicle decreases.

3. A signaling system for vehicles, including in combination: electrically-responsive signal-means; a source of electrical energy; current-transmitting means supplying energy from the said source to the said signal-means; switch-means associated with the said current-transmitting means and controlling the energization and deenergization of the said signal-means; substantially-constant-speed drive-means functioning independently of the speed of the vehicle; and automatic control-means for the said switch-means, the said control-means including a first member driven by the running-gear of the vehicle and varying in speed with variations in the speed thereof, a second member driven by the aforesaid constant-speed drive-means, and translating-means jointly operated by both of the said first member and second member and in turn translating the relative movements thereof into operation of the said switch means, the said translating-means being constructed and arranged to cause the said switch-means to energize and deenergize the said signal-means to provide repeating cycles of on-period phases alternating with off-period phases and with each of the repeating off-period phases being of substantially-corresponding duration despite variations in speed of the vehicle and the said on-period phases progressively decreasing in duration as the speed of the vehicle decreases.

4. A signaling system for vehicles, including in combination: electrically-responsive signal-means; a source of electrical energy; current-transmitting means supplying energy from the said source to the said signal-means; first switch-means and second switch-means both associated with the said current-transmitting means and jointly controlling the energization and deenergization of the said signal-means; substantially-constant-speed drive-means functioning independently of the speed of the vehicle; first automatic control-means for the said first switch-means and including a first member driven by the running-gear of the vehicle and varying in speed with variations in the speed thereof, and a second member driven by the aforesaid constant-speed drive-means; second automatic control-means for the said second switch-means and including a third member driven by the aforesaid constant-speed drive-means; and translating-means jointly operated by the said first member, second member and third member, the said translating-means being constructed and arranged to cause the said first switch-means and second switch-means to cooperate to energize and deenergize the said signal-means to provide repeating cycles of on-period phases alternating with off-period phases and with each of one type of repeating phases being of substantially-corresponding duration despite variations in speed of the vehicle and the other said type of phases progressively decreasing in duration as the speed of the vehicle decreases.

5. A signaling system for vehicles, including in combination: electrically-responsive signal-means; a source of electrical energy; current-transmitting means supplying energy from the said source to the said signal-means; first switch-means and second switch-means both associated with the said current-transmitting means and jointly controlling the energization and deenergization of the said signal-means; substantially-constant-speed drive-means functioning independently of the speed of the vehicle; first automatic control-means for the said first switch-means and including a first member driven by the running-gear of the vehicle and varying in speed with variations in the speed thereof, and a second member driven by the aforesaid constant-speed drive-means; second automatic control-means for the said second switch-means and including a third member driven by the aforesaid constant-speed drive-means; and translating-means jointly operated by the said first member, second member and third member, the said translating-means being constructed and arranged to cause the said first switch-means and second switch-means to cooperate to energize and deenergize the said signal-means to provide repeating cycles of on-period phases alternating with off-period phases and with each of the repeating on-period phases being of substantially-corresponding duration despite variations in speed of the vehicle and the said off-period phases progressively decreasing in duration as the speed of the vehicle decreases.

6. A signaling system for vehicles, including in combination: electrically-responsive signal-means; a source of electrical energy; current-transmitting means supplying energy from the said source to the said signal-means; first switch-means and second switch-means both associated with the said current-transmitting means and jointly controlling the energization and deenergization of the said signal-means; substantially-constant-speed drive-means functioning independently of the speed of the vehicle; first automatic control-means for the said first switch-means and including a first member driven by the running-gear of the vehicle and varying in speed with variations in the speed thereof, and a second member driven by the aforesaid constant-speed drive-means; second automatic control-means for the said second switch-means and including a third member driven by the aforesaid constant-speed drive-means; and translating-means jointly operated by the said first member, second member, and third member, the said translating-means being constructed and arranged to cause the said first switch-means and second switch-means to cooperate to energize and deenergize the said signal-means to provide repeating cycles of on-period phases alternating with off-period phases and with each of the repeating off-period phases being of substantially-corresponding duration despite variations in speed of the vehicle and the said on-period phases progressively decreasing in duration as the speed of the vehicle decreases.

7. A signaling system for vehicles, including in combination: electrically-responsive signal-means; a source of electrical energy; current-transmitting means supplying energy from the said source to the said signal-means; first switch-means and second switch-means both associated with the said current-transmitting means and jointly controlling the energization and deenergization of the said signal-means; substantially-constant-speed drive-means functioning independently of the speed of the vehicle; first automatic control-means for the said first switch-means and including a first member driven by the running-gear of the vehicle and varying in speed with variations in the speed thereof, a second member driven by the aforesaid constant-speed drive-means, and mechanical translating-means jointly operated by the said first member and the said second member and in turn translating the relative movements thereof into operation of the said first switch-means; and second automatic control-means for the said second switch-means and including electrical translating-means operatively associated with the said mechanical translating-means; the said mechanical translating-means and the said electrical translating-means being constructed and arranged to cause the said first switch-means and second switch-means to cooperate to energize and deenergize the said signal-means to provide repeating cycles of on-period phases alternating with off-period phases and with each of one type of repeating phases being of substantially-corresponding duration despite variations in speed of the vehicle and the other said type of phases progressively decreasing in duration as the speed of the vehicle decreases.

8. A signaling system for vehicles, including in combination: electrically-responsive signal-means; a source of electrical energy; current-transmitting means supplying energy from the said source to the said signal-means; first switch-means and second switch-means both associated with the said current-transmitting means and jointly controlling the energization and deenergization of the said signal-means; substantially-constant-speed drive-means functioning independently of the speed of the vehicle; first automatic control-means for the said first switch-means and including a first member driven by the running-gear of the vehicle and varying in speed with variations in the speed thereof, a second member driven by the aforesaid constant-speed drive-means, and mechanical translating-means jointly operated by the said first member and the said second member and in turn translating the relative movements thereof into operation of the said first switch-means; and second automatic control-means for the said second switch-means and including electrical translating-means operatively associated with the said mechanical translating-means; the said mechanical translating-means and the said electrical translating-means being constructed and arranged to cause the said first switch-means and second switch-means to cooperate to energize and deenergize the said signal-means to provide repeating cycles of on-period phases alternating with off-period phases and with each of the repeating on-period phases being of substantially-corresponding duration despite variations in speed of the vehicle and the said off-period phases progressively decreasing in duration as the speed of the vehicle decreases.

9. A signaling system for vehicles, including in combination: electrically-responsive signal-means; a source of electrical energy; current-transmitting means supplying energy from the said source to the said signal-means; first switch-means and second switch-means both associated with the said current-transmitting means and jointly controlling the energization and deenergization of the said signal-means; substantially-constant-speed drive-means functioning independently of the speed of the vehicle; first automatic control-means for the said first switch-means and including a first member driven by the running-gear of the vehicle and varying in speed with variations in the speed thereof, a second member driven by the aforesaid constant-speed drive-means, and mechanical translating-means jointly operated by the said first member and the said second member and in turn translating the relative movements thereof into operation of the said first switch-means; and second automatic control-means for the said second switch-means and including electrical translating-means operatively associated with the said mechanical translating-means; the said mechanical translating-means and the said electrical translating-means being constructed and arranged to cause the said first switch-means and second switch-means to cooperate to energize and deenergize the said signal-means to provide repeating cycles of on-period phases alternating with off-period phases and with each of the repeating off-period phases being of substantially-corresponding duration despite variations in speed of the vehicle and the said on-period phases progressively decreasing in duration as the speed of the vehicle decreases.

10. A signaling system for vehicles, including in combination: electrically-responsive signal-means; a source of electrical energy; current-transmitting means supplying energy from the said source to the said signal-means; first switch-means and second switch-means both associated with the said current-transmitting means and jointly controlling the energization and deenergization of the said signal-means; substantially-constant-speed drive-means functioning independently of the speed of the vehicle; first automatic control-means for the said first switch-means and including a first member driven by the running-gear of the vehicle and varying in speed with variations in the speed thereof, a second member driven by the aforesaid constant-speed drive-means, and first translating-means jointly operated by the said first member and the said second member and in turn translating the relative movements thereof into operation of the said first switch-means; and second automatic control-means for the said second switch-means and including the said first translating-means, a third member driven by the aforesaid constant-speed drive-means, and second translating-means jointly operated by the said first translating-means and the said third member and in turn translating relative movements thereof into the operation of the said second switch-means; the said first translating-means and the said second translating-means being constructed and arranged to cause the said first switch-means and second switch-means to cooperate to energize and deenergize the said signal-means to provide repeating cycles of on-period phases alternating with off-period phases and with each of one type of repeating phases being of substantially-corresponding duration despite variations in speed of the vehicle and the other said type of phases progressively decreasing in duration as the speed of the vehicle decreases.

11. A signaling system for vehicles, including in combination: electrically-responsive signal-means; a source of electrical energy; current-transmitting means supplying energy from the said source to the said signal-means; first switch-means and second switch-means both associated with the said current-transmitting means and jointly controlling the energization and deenergization of the said signal-means; substantially-constant-speed drive-means functioning independently of the speed of the vehicle; first automatic control-means for the said first switch-means and including a first member driven by the running-gear of the vehicle and varying in speed with variations in the speed thereof, a second member driven by the aforesaid constant-speed drive-means, and first translating-means jointly operated by the said first member and the said second member and in turn translating the relative movements thereof into operation of the said first switch-means; and second automatic control-means for the said second switch-means and including the said first translating-means, a third member driven by the aforesaid constant-speed drive-means, and second translating-means jointly operated by the said first translating-means and the said third member and in turn translating relative movements thereof into the operation of the said second switch-means; the said first translating-means and the said second translating-means being constructed and arranged to cause the said first switch-means and second switch-means to cooperate to energize and deenergize the said signal-means to provide repeating cycles of on-period phases alternating with off-period phases and with each of the repeating on-period phases being of substantially-corresponding duration despite variations in speed of the vehicle and the said off-period phases progressively decreasing in duration as the speed of the vehicle decreases.

12. A signaling system for vehicles, including in combination: electrically-responsive signal-means; a source of electrical energy; current-transmitting means supplying energy from the said source to the said signal-means; first switch-means and second switch-means both associated with the said current-transmitting means and jointly controlling the energization and deenergization of the said signal-means; substantially-constant-speed drive-means functioning independently of the speed of the vehicle; first automatic control-means for the said first switch-means and including a first member driven by the running-gear of the vehicle and varying in speed with variations in the speed thereof, a second member driven by the aforesaid constant-speed drive-means, and first translating-means jointly operated by the said first member and the said second member and in turn translating the relative movements thereof into operation of the said first switch-means; and second automatic control-means for the said second switch-means and including the said first translating-means, a third member driven by the aforesaid constant-speed drive-means, and second translating-means jointly operated by the said first translating-means and the said third member and in turn transalting relative movements thereof into the operation of the said second switch-means; the said first translating-means and the said second translating-means being constructed and arranged to cause the said first switch-means and second switch-means to cooperate to energize and deenergize the said signal-means to provide repeating cycles of on-period phases alternating with off-period phases and with each of the repeating off-period phases being of substantially-corresponding duration despite variations in speed of the vehicle and the said on-period phases progressively decreasing in duration as the speed of the vehicle decreases.

13. A signaling system for vehicles, including in combination: electrically-responsive signal-means; a source of electrical energy; current-transmitting means supplying energy from the said source to the said signal-means; first switch-means and second switch-means both associated with the said current-transmitting means and jointly controlling the energization and deenergization of the said signal-means; substantially-constant-speed drive-means functioning independently of the speed of the vehicle; first automatic control-means for the said first switch-means and including a first member driven by the running-gear of the vehicle and varying in speed with variations in the speed thereof, a second member driven by the aforesaid constant-speed drive-means, and mechanical translating-means jointly operated by the said first member and the said second member and in turn translating the relative movements thereof into operation of the said first switch-means; and second automatic control-means for the said second switch-means and including the said first switch-means and electronic translating-means; the said first automatic control-means and the said second automatic control-means being constructed and arranged to cause the said first switch-means and second switch-means to cooperate to energize and deenergize the said signal-means to provide repeating cycles of on-period phases alternating with off-period phases and with each of one type of repeating phases being of substantially-corresponding duration despite variations in speed of the vehicle and the other said type of phases progressively decreasing in duration as the speed of the vehicle decreases.

14. A signaling system for vehicles, including in combination: electrically - responsive signal-means; a source of electrical energy; current-transmitting means supplying energy from the said source to the said signal-means; first switch-means and second switch-means both associated with the said current-transmitting means and jointly controlling the energization and deenergization of the said signal-means; substantially-constant-speed drive-means functioning independently of the speed of the vehicle; first automatic control-means for the said first switch-means and including a first member driven by the running-gear of the vehicle and varying in speed with variations in the speed thereof, a second member driven by the aforesaid constant-speed drive-means, and mechanical translating-means jointly operated by the said first member and the said second member and in turn translating the relative movements thereof into operation of the said first switch-means; and second automatic control-means for the said second switch-means and including the said first switch-means and electronic translating-means; the said first automatic control-means and the said second automatic control-means being constructed and arranged to cause the said first switch-means and second switch-means to cooperate to energize and deenergize the said signal-means to provide repeating cycles of on-period phases alternating with off-period phases and with each of the repeating on-period phases being of substantially-corresponding duration despite variations in speed of the vehicle and the said off-period phases progressively decreasing in duration as the speed of the vehicle decreases.

15. A signaling system for vehicles, including in combination: electrically-responsive signal-means; a source of electrical energy; current-transmitting means supplying energy from the said source to the said signal-means; first switch-means and second switch-means both associated with the said current-transmitting means and jointly controlling the energization and deenergization of the said signal-means; substantially-constant-speed drive-means functioning independently of the speed of the vehicle; first automatic control-means for the said first switch-means and including a first member driven by the running-gear of the vehicle and varying in speed with variations in the speed thereof, a second member driven by the aforesaid constant-speed drive-means, and mechanical translating-means jointly operated by the said first member and the said second member and in turn translating the relative movements thereof into operation of the said first switch-means; and second automatic control-means for the said second switch-means and including the said first switch-means and electronic translating-means; the said first automatic control-means and the said second automatic control-means being constructed and arranged to cause the said first switch-means and second switch-means to cooperate to energize and deenergize the said signal-means to provide repeating cycles of on-period phases alternating with off-period phases and with each of the repeating off-period phases being of substantially-corresponding duration despite variations in speed of the vehicle and the said on-period phases progressively decreasing in duration as the speed of the vehicle decreases.

16. A signaling system for vehicles, including in combination: two speed-indicating signal lamps; a source of electrical energy; current-transmitting means supplying energy from the said source to the said signal lamps; switch-means associated with the said current-transmitting means and controlling the energization and deenergization of the said signal lamps; substantially-constant-speed drive-means functioning independently of the speed of the vehicle; and automatic control-means for the said switch-means, the said control-means including a first member driven by the running-gear of the vehicle and varying in speed with variations in the speed thereof, a second member driven by the aforesaid constant-speed drive-means, and translating-means jointly operated by both of the said first member and second member and in turn translating the relative movements thereof into operation of the said switch-means, the said translating-means being constructed and arranged to cause the said switch-means to energize and deenergize one of the said signal lamps to provide repeating cycles of on-period phases alternating with off-period phases and with each of the repeating on-period phases being of substantially-corresponding duration despite variations in speed of the vehicle and the said off-period phases progressively decreasing in duration as the speed of the vehicle decreases, and to deenergize and energize the other of the said signal lamps to provide repeating cycles of off-period phases alternating with on-period phases and with each of the repeating off-period phases being of substantially-corresponding duration despite variations in speed of the vehicle and the said on-period phases progressively decreasing in duration as the speed of the vehicle decreases.

17. A signaling system for vehicles, including in combination: two speed-indicating signal lamps; a source of electrical energy; current-transmitting means supplying energy from the said source to the said signal lamps; first switch-means and second switch-means both associated with the said current-transmitting means and jointly controlling the energization and deenergization of the said signal lamps; substantially-constant-speed drive-means functioning independently of the speed of the vehicle; first automatic control-means for the said first switch-means and including a first member driven by the running-gear of the vehicle and varying in speed with variations in the speed thereof, and a second member driven by the aforesaid constant-speed drive-means; second automatic control-means for the said second switch-means and including a third member driven by the aforesaid constant-speed drive-means; and translating-means jointly operated by the said first member, second member and third member, the said translating-means being constructed and arranged to cause the said first switch-means and second switch-means to cooperate to energize and deenergize one of the said signal lamps to provide repeating cycles of on-period phases alternating with off-period phases and with each of the repeating on-period phases being of substantially-corresponding duration despite variations in speed of the vehicle and the said off-period phases progressively decreasing in duration as the speed of the vehicle decreases, and to deenergize and energize the other of the said signal lamps to provide repeating cycles of off-period phases alternating with on-period phases and with each of the repeating off-period phases being of substantially-corresponding duration despite variations in speed of the vehicle and the said on-period phases progressively decreasing in duration as the speed of the vehicle decreases.

18. A signaling system for vehicles, including in combination: two speed-indicating signal lamps; a source of electrical energy; current-transmitting means supplying energy from the said source to the said signal lamps; first switch-means and second switch-means both associated with the said current-transmitting means and jointly controlling the energization and deenergization of the said signal lamps; substantially-constant-speed drive-means functioning independently of the speed of the vehicle; first automatic control-means for the said first switch-means and including a first member driven by the running-gear of the vehicle and varying in speed with variations in the speed thereof, a second member driven by the aforesaid constant-speed drive-means, and mechanical translating-means jointly operated by the said first member and the said second member and in turn translating the relative movements thereof into operation of the said first switch-means; and second automatic control-means for the said second switch-means and including electrical translating-means operatively associated with the said mechanical translating-means; the said mechanical translating-means and the said electrical translating-means being constructed and arranged to cause the said first switch-means and second switch-means to cooperate to energize and deenergize one of the said signal lamps to provide repeating cycles of on-period phases alternating with off-period phases and with each of the repeating on-period phases being of substantially-corresponding duration despite variations in speed of the vehicle and the said off-period phases progressively decreasing in duration as the speed of the vehicle decreases, and to deenergize and energize the other of the said signal lamps to provide repeating cycles of off-period phases alternating with on-period phases and with each of the repeating off-period phases being of substantially-corresponding duration despite variations in speed of the vehicle and the said on-period phases progressively decreasing in duration as the speed of the vehicle decreases.

19. A signaling system for vehicles, including in combination: two speed-indicating signal lamps; a source of electrical energy; current-transmitting means supplying energy from the said source to the said signal lamps; first switch-means and second switch-means both associated with the said current-transmitting means and jointly controlling the energization and deenergization of the said signal lamps; substantially-constant-speed drive-means functioning independently of the speed of the vehicle; first automatic control-means for the said first switch-means and including a first member driven by the running-gear of the vehicle and varying in speed with variations in the speed thereof, a second member driven by the aforesaid constant-speed drive-means, and first translating-means jointly operated by the said first member and the said second member and in turn translating the relative movements thereof into operation of the said first switch-means; and second automatic control-means for the said second switch-means and including the said first translating-means, a third member driven by the aforesaid constant-speed drive-means, and second translating-means jointly operated by the said first translating-means and the said third member and in turn translating relative movements thereof into the operation of the said second switch-means; the said first translating-means and the said second translating-means being constructed and arranged to cause the said first switch-means and second switch-means to cooperate to energize and deenergize one of the said signal lamps to provide repeating cycles of on-period phases alternating with off-period phases and with each of the repeating on-period phases being of substantially-corresponding duration despite variations in speed of the vehicle and the said off-period phases progressively decreasing in duration as the speed of the vehicle decreases, and to deenergize and energize the other of the said signal lamps to provide repeating cycles of off-period phases alternating with on-period phases and with each of the repeating off-period phases being of substantially-corresponding duration despite variations in speed of the vehicle and the said on-period phases progressively decreasing in duration as the speed of the vehicle decreases.

20. A signaling system for vehicles, including in combination: two speed-indicating signal lamps; a source of electrical energy; current-transmitting means supplying energy from the said source to the said signal lamps; first switch-means and second switch-means both associated with the said current-transmitting means and jointly controlling the energization and deenergization of the said signal lamps; substantially-constant-speed drive-means functioning independently of the speed of the vehicle; first automatic control-means for the said first switch-means and including a first member driven by the running-gear of the vehicle and varying in speed with variations in the speed thereof, a second member driven by the aforesaid constant-speed drive-means, and mechanical translating-means jointly operated by the said first member and the said second member and in turn translating the relative movements thereof into operation of the said first switch-means; and second automatic control-means for the said second switch-means and including the said first switch-means and electronic translating-means; the said first automatic control-means and the said second automatic control-means being constructed and arranged to cause the said first switch-means and second switch-means to cooperate to energize and deenergize one of the said signal lamps to provide repeating cycles of on-period phases alternating with off-period phases and with each of the repeating on-period phases being of substantially-corresponding duration despite variations in speed of the vehicle and the said off-period phases progressively decreasing in duration as the speed of the vehicle decreases, and to deenergize and energize the other of the said signal lamps to provide repeating cycles of off-period phases alternating with on-period phases and with each of the repeating off-period phases being of substantially-corresponding duration despite variations in speed of the vehicle and the said on-period phases progressively decreasing in duration as the speed of the vehicle decreases.

21. The combination with a vehicle having a first speed-control member and a second speed-control member both controlling the speed of the vehicle; of a signaling system which includes: electrically-responsive signal-means; a source of electrical energy; current-transmitting means supplying energy from the said source to the said signal-means; first switch-means, second switch-means and third switch-means associated with the said current-transmitting means and jointly controlling the energization and deenergization of the said signal-means; substantially-constant-speed drive-means functioning independently of the speed of the vehicle; automatic control-means for the said first switch-means, the said control-means including a first member driven by the running-gear of the vehicle and varying in speed with variations in the speed thereof, a second member driven by the aforesaid constant-speed drive-means, and translating-means jointly operated by both of the said first member and second member and in turn translating the relative movements thereof into operation of the said first switch-means; an electromagnet for controlling the operation of the said second switch-means; an energizing circuit for the said electromagnet and including the said third switch-means; actuating-means for controlling the operation of the said third switch-means and operatively associated with the said first speed-control member of the vehicle for control by the movement thereof; and a locking-circuit for the said electromagnet and including fourth switch-means constructed and arranged for control by the movement of the said second speed-control member of the vehicle; the said third switch-means being constructed and arranged to initially energize the said electromagnet upon operation of the said first speed-control member of the vehicle, the energization of the said electromagnet being continued by the said locking-circuit when the said first speed-control member is restored to its normal position, the energization of the said electromagnet in turn actuating the said second switch-means to its operated position; the said third switch-means being actuated to the position in which it cooperates with the said first switch-means and second switch-means by restoration of the said first speed-control member of the vehicle to its inoperative position thereby rendering effective the operation of the said first switch-means by the said translating-means to energize and deenergize the said signal-means to provide repeating cycles of on-period phases alternating with off-period phases and with each of one type of repeating phases being of substantially-corresponding duration despite variations in speed of the vehicle and the other said type of phases progressively decreasing in duration as the speed of the vehicle decreases; the said fourth switch-means being constructed and arranged to deenergize the said electromagnet upon operation of the said second speed-control member of the vehicle from its inoperative position, the deenergization of the said electromagnet in turn permitting the restoration of the said second switch-means to its released position thereby rendering the operation of the said first switch-means ineffective to energize the said signal-means.

22. The combination with a vehicle having a speed-control member controlling the speed of the vehicle; of a signaling system which includes: electrically-responsive signal-means; a source of electrical energy; current-transmitting means supplying energy from the said source to the said signal-means; first switch-means including a movable element associated with the said current-transmitting means and controlling the energization and deenergization of the said signal-means; substantially-constant-speed drive-means functioning independently of the speed of the vehicle; second switch-means including a movable element; first automatic control-means for the said second switch-means, the said control-means including a first member driven by the running-gear of the vehicle and varying in speed with variations in the speed thereof, a second member driven by the aforesaid constant-speed drive-means, and first translating-means jointly operated by both of the said first member and second member and in turn translating the relative movements thereof into repeating cycles of operation of the said movable element of the said second switch-means, the said movable element being alternately maintained in a first position and in a second position by the said first translating-means and for time intervals which decrease in duration as the speed of the vehicle decreases; third switch-means including a movable element; second automatic control-means for the said third switch-means, the said control-means including the said first translating-means, and second translating-means operatively associated with the said first translating-means, the said first translating-means and said second translating-means being constructed and arranged to act jointly to provide repeating cycles of operation of the said movable element of the said third switch-means, the said movable element being maintained in a first position for repeating time intervals of substantially-corresponding duration despite variations in speed of the vehicle and alternately maintained in a second position for repeating time intervals of progressively decreasing duration as the speed of the vehicle decreases; an electromagnet controlling the operation of the said first switch-means; fourth switch-means including a movable element controlled by the said speed-control member of the vehicle, the said movable element being maintained in a first position when the said speed-control member is in its inoperative position and actuated into a second position by the operation of the said speed-control member; an energizing circuit for the said electromagnet, the said energizing circuit being rendered effective to initially energize the said electromagnet when the said movable element of the said second switch-means is in its said second position when the said movable element of the said third switch-means is in its said first position, and when the said movable element of the said fourth switch-means is in its said first position; and a locking-circuit for the said electromagnet and including the said fourth switch-means, the said locking-circuit being constructed and arranged to continue the energization of the said electromagnet subsequent to the initial energization thereof by the said energizing circuit and independently of the operation of the said second switch-means and said third switch-means; the energization of the said electromagnet in turn actuating the said movable element of the said first switch-means into its said second position to effect the energization of the said signal-means; the said fourth switch-means being constructed and arranged to deenergize the said electromagnet upon movement of its said movable element from its said first position by the movement of the said speed-control member from its inoperative position; the deenergization of the said electromagnet in turn permitting the restoration of the said movable element of the said first switch-means to its said first position thereby deenergizing the said signal-means.

23. The combination with a vehicle having a speed-control member controlling the speed of the vehicle; of a signaling system which includes: electrically-responsive signal-means; a source of electrical energy; current-transmitting means supplying energy from the said source to the said signal-means; first switch-means, second switch-means and third switch-means associated with the said current-transmitting means and jointly controlling the energization and deenergization of the said signal-means, the said first switch-means, second switch-means and third switch-means each having a movable element; substantially-constant-speed drive-means functioning independently of the speed of the vehicle; first automatic control-means for the said first switch-means, the said control-means including a first member driven by the running-gear of the vehicle and varying in speed with variations in the speed thereof, a second member driven by the aforesaid constant-speed drive-means, and first translating-means jointly operated by both of the said first member and second member and in turn translating the relative movements thereof into repeating cycles of operation of the said movable element of the said first switch-means, the said movable element being alternately maintained in a first position and in a second position by the said first translating-means and for time intervals which decrease in duration as the speed of the vehicle decreases; second automatic control-means for the said second switch-means, the said control-means including the said first translating-means, and second translating-means operatively associated with the said first translating-means, the said first translating-means and the said second translating-means being constructed and arranged to act jointly to provide repeating cycles of operation of the said movable element of the said second switch-means, the said movable element being maintained in a first position for repeating time intervals of substantially-corresponding duration despite variations in speed of the vehicle and alternately maintained in a second position for repeating time intervals of progressively decreasing duration as the speed of the vehicle decreases; an electromagnet controlling the operation of the said third switch-means; fourth switch-means including a movable element controlled by the said speed-control member of the vehicle, the said movable element being maintained in a first position when the said speed-control member is in its inoperative position and actuated into a second position by the operation of the said speed-control member; an energizing circuit for the said electromagnet, the said energizing circuit being rendered effective to initially energize the said electromagnet when the said movable element of the said first switch-means is in its said second position when the said movable element of the said second switch-means is in its said first position, and when the said movable element of the said fourth switch-means is in its said first position; and a locking-circuit for the said electromagnet including the said fourth switch-means, the said locking-circuit being constructed and arranged to continue the energization of the said electromagnet subsequent to the initial energization thereof by the said energizing circuit and independently of the operation of the said first switch-means and second switch-means; the energization of the said electromagnet in turn actuating the movable element of the said third switch-means into its said second position thereby rendering effective the operation of the said first switch-means and said second switch-means by the said first translating-means and said second translating-means to deenergize and energize the said signal-means to provide repeating cycles of off-period phases alternating with on-period phases and with each of the repeating off-period phases being of substantially-corresponding duration despite variations in speed of the vehicle and the said on-period phases progressively decreasing in duration as the speed of the vehicle decreases; the said fourth switch-means being constructed and arranged to deenergize the said electromagnet upon movement of its said movable element from its said first position by the movement of the said speed-control member from its inoperative position; the deenergization of the said electromagnet in turn permitting the restoration of the said movable element of the said third switch-means to its said first position thereby rendering the operation of the said first switch-means and said second switch-means ineffective to energize the said signal-means.

24. The combination with a vehicle having a first speed-control member and a second speed-control member both controlling the speed of the vehicle; of a signaling system for vehicles, including in combination: electrically-responsive signal-means; a source of electrical energy; current-transmitting means supplying energy from the said source to the said signal-means; first switch-means including a movable element associated with the said current-transmitting means and controlling the energization and deenergization of the said signal-means; substantially-constant-speed drive-means functioning independently of the speed of the vehicle; second switch-means including a movable element; first automatic control-means for the said second switch-means, the said control-means including a first member driven by the running-gear of the vehicle and varying in speed with variations in the speed thereof, a second member driven by the aforesaid constant-speed drive-means, and first translating-means jointly operated by both of the said first member and second member and in turn translating the relative movements thereof into repeating cycles of operation of the said movable element of the said second switch-means, the said movable element being alternately maintained in a first position and in a second position for time intervals which decrease in duration as the speed of the vehicle decreases; third switch-means including a movable element; second automatic control-means for the said third switch-means, the said control-means including the said first translating-means, and second translating-means operatively associated with the said first translating-means, the said first translating-means and said second translating-means being constructed and arranged to act jointly to provide repeating cycles of operation of the said movable element of the said third switch-means, the said movable element being maintained in a first position for repeating time intervals of substantially-corresponding duration despite variations in speed of the vehicle and alternately maintained in a second position for repeating time intervals of progressively decreasing duration as the speed of the vehicle decreases; fourth switch-means and fifth switch-means, the said switch-means each including a movable element; a first electromagnet operatively associated with the said fourth switch-means and fifth switch-means and controlling the operation of the said movable elements thereof; sixth switch-means including a movable element controlled by the first speed-control member of the vehicle, the said movable element being maintained in a first position when the said first speed-control member is in its inoperative position and actuated into a second position by the operation of the said speed-control member; a first energizing circuit for the said first electromagnet, the said energizing circuit being rendered effective to initially energize the said first electromagnet when the said movable element of the said second switch-means is in its said second position when the said movable element of the said third switch-means is in its said first position, and when the said movable element of the said sixth switch-means is in its said first position; a first locking-circuit for the said first electromagnet and including the said fourth switch-means and the said sixth switch-means, the said first locking-circuit being constructed and arranged to continue the energization of the said first electromagnet subsequent to the initial energization thereof by the said first energizing circuit and independently of the operation of the said second switch-means and said third switch-means; the energization of the said first electromagnet in turn actuating the said movable element of the said fifth switch-means into its operative position; seventh switch-means including a movable element; a second electromagnet controlling the operation of the said first switch-means and the said seventh switch-means; eighth switch-means including a movable element controlled by the said second speed-control member of the vehicle, the said movable element being maintained in a first position when the said second speed-control member is in its inoperative position and actuated into a second position by the operation of the said speed-control member; a second energizing circuit for the said second electromagnet, the said second energizing circuit being rendered effective to energize the said second electromagnet by the actuation of the said movable element of the said eighth switch-means into its said second position under the control of the operation of the said second speed-control member; and a second locking-circuit for the said second electromagnet and including the said fifth switch-means and the said seventh switch-means, the said second locking-circuit being constructed and arranged to continue the energization of the said second electromagnet subsequent to the initial energization thereof by the said second energizing circuit and independently of the operation of the said eighth switch-means under the control of the said second speed-control member; the energization of the said second electromagnet in turn actuating the said movable element of the said first switch-means into its said second position thereby effecting the energization of the said signal-means; the said sixth switch-means being constructed and arranged to deenergize the said first electromagnet upon movement of its said movable element from its said first position by the movement of the said first speed-control member from its inoperative position; the deenergization of the said first electromagnet in turn permitting the restoration of the said movable element of the said fifth switch-means to its said first position, the restoration of the said movable element of the said fifth switch-means in turn effecting the deenergization of the said second electromagnet thereby permitting the restoration of the said movable element of the said first switch-means to its said first position, the restoration of the said movable element of the said first switch-means to its said first position thereby deenergizing the said signal-means.

25. The combination with a vehicle having a first speed-control member and a second speed-control member both controlling the speed of the vehicle; of a signaling system for vehicles, including in combination: electrically-responsive signal-means; a source of electrical energy; current-transmitting means supplying energy from the said source to the said signal-means; first switch-means and second switch-means, the said first switch-means and the said second switch-means each including a movable element associated with the said current-transmitting means and controlling the energization and deenergization of the said signal-means; substantially-constant-speed drive-means functioning independently of the speed of the vehicle; third switch-means including a movable element; first automatic control-means for the said third switch-means, the said control-means including a first member driven by the running-gear of the vehicle and varying in speed with variations in the speed thereof, a second member driven by the aforesaid constant-speed drive-means, and first translating-means jointly operated by both of the said first member and second member and in turn translating the relative movements thereof into repeating cycles of operation of the said movable element of the said third switch-means, the said movable element being alternately maintained in a first position and in a second position by the said first translating-means and for time intervals which decrease in duration as the speed of the vehicle decreases; fourth switch-means including a movable element; second automatic control-means for the said fourth switch-means, the said control-means including the said first translating - means, and second translating-means operatively associated with the said first translating-means, the said first translating-means and the said second translating-means being constructed and arranged to act jointly to provide repeating cycles of operation of the said movable element of the said fourth switch-means, the said movable element being maintained in a first position for repeating time intervals of substantially-corresponding duration despite variations in speed of the vehicle and alternately maintained in a second position for repeating time intervals of progressively decreasing duration as the speed of the vehicle decreases; third automatic control-means for the said second switch-means, the said control-means including a third member driven by the running-gear of the vehicle and varying in speed with variations in the speed thereof, a fourth member driven by the aforesaid constant-speed drive-means, and third translating-means jointly operated by both of the said third member and fourth member and in turn translating the relative movements thereof into repeating cycles of operation of the movable element of the said second switch-means; fifth switch-means and sixth switch-means, the said fifth switch-means and the said sixth switch-means each including a movable element; a first electromagnet operatively associated with the said fifth switch-means and sixth switch-means and controlling the operation of the movable elements thereof; seventh switch-means including a movable element controlled by the said first speed-control member of the vehicle, the said movable element being maintained in a first position when the said first speed-control member is in its inoperative position and actuated into a second position by the operation of the said speed-control member; a first energizing circuit for the said first electromagnet, the said energizing circuit being rendered effective to initially energize the said first electromagnet when the said movable element of the said third switch-means is in its said second position, when the said movable element of the said fourth switch-means is in its said first position and when the said movable element of the said seventh switch-means is in its said first position; a first locking-circuit for the said first electromagnet and including the said fifth switch-means and the said seventh switch-means, the said first locking-circuit being constructed and arranged to continue the energization of the said first electromagnet subsequent to the initial energization thereof by the said first energizing circuit and independently of the operation of the said third switch-means and said fourth switch-means; the energization of the said first electromagnet in turn actuating the movable element of the said sixth switch-means into its operative position; eighth switch-means including a movable element; a second electromagnet for controlling the operation of the said first switch-means and the said eighth switch-means; ninth switch-means including a movable element controlled by a second speed-control member of the vehicle, the said movable element being maintained in a first position when the said second speed-control member is in its inoperative position and actuated into a second position by the operation of the said second speed-control member; a second energizing circuit for the said second electromagnet, the said second energizing circuit being rendered effective to energize the said second electromagnet by the actuation of the movable element of the said ninth switch-means into its said second position under the control of the operation of the said second speed-control member; and a second locking-circuit for the said second electromagnet and including the said sixth switch-means and the said eighth switch-means, the said second locking-circuit being constructed and arranged to continue the energization of the said second electromagnet subsequent to the initial energization thereof by the said second energizing circuit and independently of the operation of the said ninth switch-means under the control of the said second speed-control member; the energization of the said second electromagnet in turn actuating the movable element of the said first switch-means into its said second position thereby rendering effective the operation of the said second switch-means by the said third translating-means to energize and deenergize the said signal-means to provide repeating cycles of on-period phases alternating with off-period phases, the said seventh switch-means being constructed and arranged to deenergize the said first electromagnet upon movement of its said movable element from its said first position by the movement of the said first speed-control member from its inoperative position, the deenergization of the said first electromagnet in turn permitting the restoration of the movable element of the said sixth switch-means to its said first position, the said restoration of the movable element of the said sixth switch-means in turn effecting the deenergization of the said second electromagnet thereby permitting the restoration of the movable element of the said first switch-means to its said first position, the restoration of the movable element of the said first switch-means to its said first position thereby rendering the operation of the said second switch-means ineffective to energize the said signal-means.

HENRY SPICER DAVIS.